United States Patent
Lally et al.

(10) Patent No.: US 12,518,038 B2
(45) Date of Patent: Jan. 6, 2026

(54) SECURE DECENTRALIZED CONTROL OF NETWORK ACCESS TO AI MODELS AND DATA

(71) Applicant: DOGWOOD LOGIC, INC., Blacksburg, VA (US)

(72) Inventors: Evan M. Lally, Blacksburg, VA (US); Sandra M. Klute, Blacksburg, VA (US)

(73) Assignee: DOGWOOD LOGIC, INC., Blacksburg, VA (US)

( * ) Notice: Subject to any disclaimer, the term of this patent is extended or adjusted under 35 U.S.C. 154(b) by 520 days.

(21) Appl. No.: 17/783,190

(22) PCT Filed: Dec. 30, 2020

(86) PCT No.: PCT/US2020/067472
§ 371 (c)(1),
(2) Date: Jun. 7, 2022

(87) PCT Pub. No.: WO2021/138426
PCT Pub. Date: Jul. 8, 2021

(65) Prior Publication Data
US 2022/0414237 A1 Dec. 29, 2022

Related U.S. Application Data

(60) Provisional application No. 62/955,369, filed on Dec. 30, 2019.

(51) Int. Cl.
*G06F 21/62* (2013.01)
*G06F 21/60* (2013.01)
(Continued)

(52) U.S. Cl.
CPC ........ *G06F 21/6218* (2013.01); *G06F 21/604* (2013.01); *H04L 9/3247* (2013.01); *H04L 9/50* (2022.05)

(58) Field of Classification Search
CPC .. G06N 3/08; G06N 3/098; H04L 9/50; G06F 21/604; G06F 21/6245
See application file for complete search history.

(56) References Cited

U.S. PATENT DOCUMENTS 9,467,299 B1 10/2016 Alexander
10,637,666 B1 * 4/2020 Blankstein ............ G06F 3/0647
(Continued)

FOREIGN PATENT DOCUMENTS

EP 3 422 221 1/2019

OTHER PUBLICATIONS

International Preliminary Report on Patentability for PCT/US2020/067472 dated Nov. 24, 2021, 36 pages.
(Continued)

*Primary Examiner* — Jeremy S Duffield
(74) *Attorney, Agent, or Firm* — NIXON & VANDERHYE P.C.

(57) ABSTRACT

Decentralized database technology is applied to decentralized artificial intelligence (AI) information enabling collaborative AI techniques to enhance the performance of AI models and gain new insights with larger and/or better curated data sets. AI information from multiple independent sources is linked together and synthesized to render the AI information searchable, discoverable, accessible, and traceable, while also ensuring that information remains under its source's control over its lifetime, e.g., controlling the conditions under which other entities may access which pieces of AI information at a particular time.

21 Claims, 18 Drawing Sheets

(51) Int. Cl.
  *H04L 9/00*  (2022.01)
  *H04L 9/32*  (2006.01)

(56) References Cited

U.S. PATENT DOCUMENTS

| | | |
|---|---|---|
| 10,719,623 B1 | 7/2020 | Miller |
| 11,936,796 B1 | 3/2024 | Allen |
| 12,160,522 B2 | 12/2024 | Sumner |
| 2008/0263644 A1* | 10/2008 | Grinstein ............. G06F 21/445 |
| | | 726/6 |
| 2010/0043070 A1 | 2/2010 | Okada et al. |
| 2011/0106769 A1 | 5/2011 | Baptist et al. |
| 2012/0102566 A1 | 4/2012 | Vrancken |
| 2013/0194301 A1* | 8/2013 | Robbins ................. H04L 51/02 |
| | | 345/629 |
| 2013/0283362 A1 | 10/2013 | Kress et al. |
| 2014/0164774 A1 | 6/2014 | Nord et al. |
| 2017/0318008 A1 | 11/2017 | Mead |
| 2018/0316502 A1* | 11/2018 | Nadeau ................. H04L 9/0891 |
| 2019/0312734 A1* | 10/2019 | Wentz ................... H04L 9/3239 |
| 2019/0371457 A1* | 12/2019 | Paffel ................... H04L 9/3239 |
| 2019/0372770 A1 | 12/2019 | Xu et al. |
| 2020/0005255 A1 | 1/2020 | Wu |
| 2020/0082061 A1* | 3/2020 | Goldston ................ G06F 16/61 |
| 2020/0143300 A1* | 5/2020 | Weldemariam ..... G06Q 10/0635 |
| 2020/0204375 A1* | 6/2020 | Coulmeau ............. G06N 20/10 |
| 2020/0327250 A1* | 10/2020 | Wang .................... G06N 20/00 |
| 2021/0075623 A1* | 3/2021 | Petersen ............. G06Q 20/401 |
| 2021/0165898 A1* | 6/2021 | Weiss .................... G06F 16/13 |
| 2021/0184844 A1* | 6/2021 | Okano ................. H04L 9/0861 |
| 2022/0038442 A1 | 2/2022 | Lev |
| 2022/0345314 A1* | 10/2022 | Doiron .................. G16B 50/50 |

OTHER PUBLICATIONS

International Search Report for PCT/US2020/067472 dated Mar. 31, 2021, 2 pages.
Written Opinion of the ISA for PCT/US2020/067472 dated Mar. 31, 2021, 8 pages.
U.S. Appl. No. 18/012,043, filed Dec. 21, 2022, Lally et al.
Office Action dated May 21, 2025 for U.S. Appl. No. 18/012,043, 12 pages.
International Search Report and Written Opinion of the ISA for PCT/US2021/040283, mailed Jan. 6, 2022, 20 pages.
Corrected International Preliminary Report on Patentability for PCT/US2021/040283 mailed Feb. 8, 2023, 86 pages.

* cited by examiner

SECURE DECENTRALIZED CONTROL OF NETWORK ACCESS TO AI MODELS AND DATA

CROSS-REFERENCES TO RELATED APPLICATIONS

This application is the U.S. national phase of International Application No. PCT/US2020/067472 filed Dec. 30, 2020 which designated the U.S. and claims priority to U.S. Provisional Patent Application No. 62/955,369 filed Dec. 30, 2019, the entire contents of each of which are hereby incorporated by reference.

BACKGROUND

Individuals, corporations, research institutions, government agencies, and other entities increasingly rely on and interact with Artificial Intelligence (AI) models. They are also continually generating data that can be used to train AI models or can be operated on by AI models to gain insights. That AI information is valuable and often contains sensitive information, such as personally identifiable information (PII), intellectual property, trade secrets, or other proprietary information which must be protected and secured against unauthorized access and use. These security concerns lead to isolation, with multiple parties independently working to solve similar problems without the ability to leverage each other's work or information.

As AI technology advances, new modes of collaborative AI development and operation are emerging. For example, AI models may be adapted or enhanced by adding, modifying, and/or recombining computational layers and by training or transfer learning with new sets of data and annotations. AI data sets may be merged, updated, and/or (re)-annotated to achieve a new test or training result. Applied to the vast amounts of decentralized AI information currently isolated, collaborative AI techniques offer tremendous opportunities to enhance the performance of AI models and gain new insights with larger and/or better curated data sets.

But to date, there exists no technology that can link together and synthesize AI information from multiple independent parties in a way that renders the information searchable, discoverable, accessible, and traceable, while also ensuring that information remains under its sources' control over its lifetime, such that the owner can chose under which terms, which individuals or AI algorithms may access which pieces of information at a particular time.

Centralized solutions require owners of information to surrender control of their data or the resulting AI model updates to a service provider, or they keep that data in isolation, unable to improve AI models or be acted upon by those models.

Electronic decentralized ledger technologies (e.g., blockchain) have been considered to solve general traceability issues, but proposed blockchain-based solutions lack an interoperating mechanism for sensitive storage, access control, and linking of information stored off-chain, under decentralized control and integrated in such a way that traceability and conformance with license terms are ensured.

SUMMARY

Example embodiments include methods, apparatus, and a non-transitory computer-readable storage medium to control access by requesting computers decentralized across a computer network to artificial intelligence (AI) information stored in decentralized database on the computer network. A providing computer generates AI information including: (i) one or more AI models, (ii) data sets and/or annotations used to test, train, or operate the one or more AI models, and/or (iii) AI model-generated output data generated from the one or more AI models. The generated AI information is stored in encrypted format in portions of the decentralized database allocated to the generated AI information. The providing computer selectively controls access to some of the generated AI information by the requesting computers. One or more of the requesting computers requests access to the generated AI information useable by the one or more requesting computers to facilitate machine learning, model operation, and/or data aggregation with other computers across the computer network. An electronic decentralized ledger under decentralized control is used to record and/or verify: each authorization to access the generated AI information granted to each of the requesting computers, each access of the generated AI information made by each of the requesting computers, and/or each operation performed on or using the generated AI information by each of the requesting computers.

Example embodiments include methods, apparatus, and a non-transitory computer-readable storage medium for requesting access to third-party information stored in a decentralized database on a computer network. A requesting computer discovers AI information related to one or more AI models or associated data controlled by one of multiple providing computers on the computer network. The AI information includes one or more artificial intelligence (AI) models, data sets and/or annotations used to test, train, or operate the one or more AI models, and/or AI model-generated output data generated from the one or more AI models. The requesting computer requests from the one providing computer access to the AI information controlled by the one providing computer. Authorization capabilities are issued by the providing computer and used by the requesting computer to access the AI information. Then, the requesting computer can operate on or with the requested AI information to generate a result useable to facilitate machine learning, model operation, and/or data aggregation and store the result from the operating in the decentralized database.

Further example embodiments include a system comprising a computer network, a decentralized database on the computer network, requesting computers decentralized across the computer network configured to access artificial intelligence (AI) information stored in the decentralized database, and at least one providing computer on the computer network configured to store in a encrypted format in portions of the decentralized database AI information including: (i) one or more AI models, (ii) data sets and/or annotations used to test, train, or operate the one or more AI models, and/or (iii) AI model-generated output data generated from the one or more AI models. Each of the requesting computers is configured to: discover the AI information associated with the providing computer and request access to the AI information controlled by the one providing computer, receive authorization capabilities for the requesting computer to access the AI information, access the AI information using the authorization capabilities, operate on or with the requested AI information to produce a result useable to facilitate machine learning, model operation, and/or data aggregation, and store the result from the operating in the decentralized database. The providing computer is configured to: selectively control access to some of the generated AI information by the requesting computers, and use an electronic decentralized ledger under decentralized control to record and verify: each authorization to access the generated AI information granted to each of the requesting computers, each access of the generated AI information made by each of the t requesting computers, or each operation performed on or using the generated AI information by each of the requesting computers.

DETAILED DESCRIPTION OF EXAMPLE NON-LIMITING EMBODIMENTS

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

The technology described in this application deals with Artificial Intelligence (AI) information, which encompasses input data, test/training data and associated ground-truth annotations, the AI models themselves, and their output insights. Furthermore, AI models may include machine learning algorithms, neural networks, heuristics, and search/sort/filtering algorithms, configured to interpret external data, to learn from such data, and to use those learnings to achieve specific goals and tasks through flexible adaptation. Such AI models may have a variety of uses, including data analytics and predictive analytics applications.

Decentralized Database System

Figure 1:
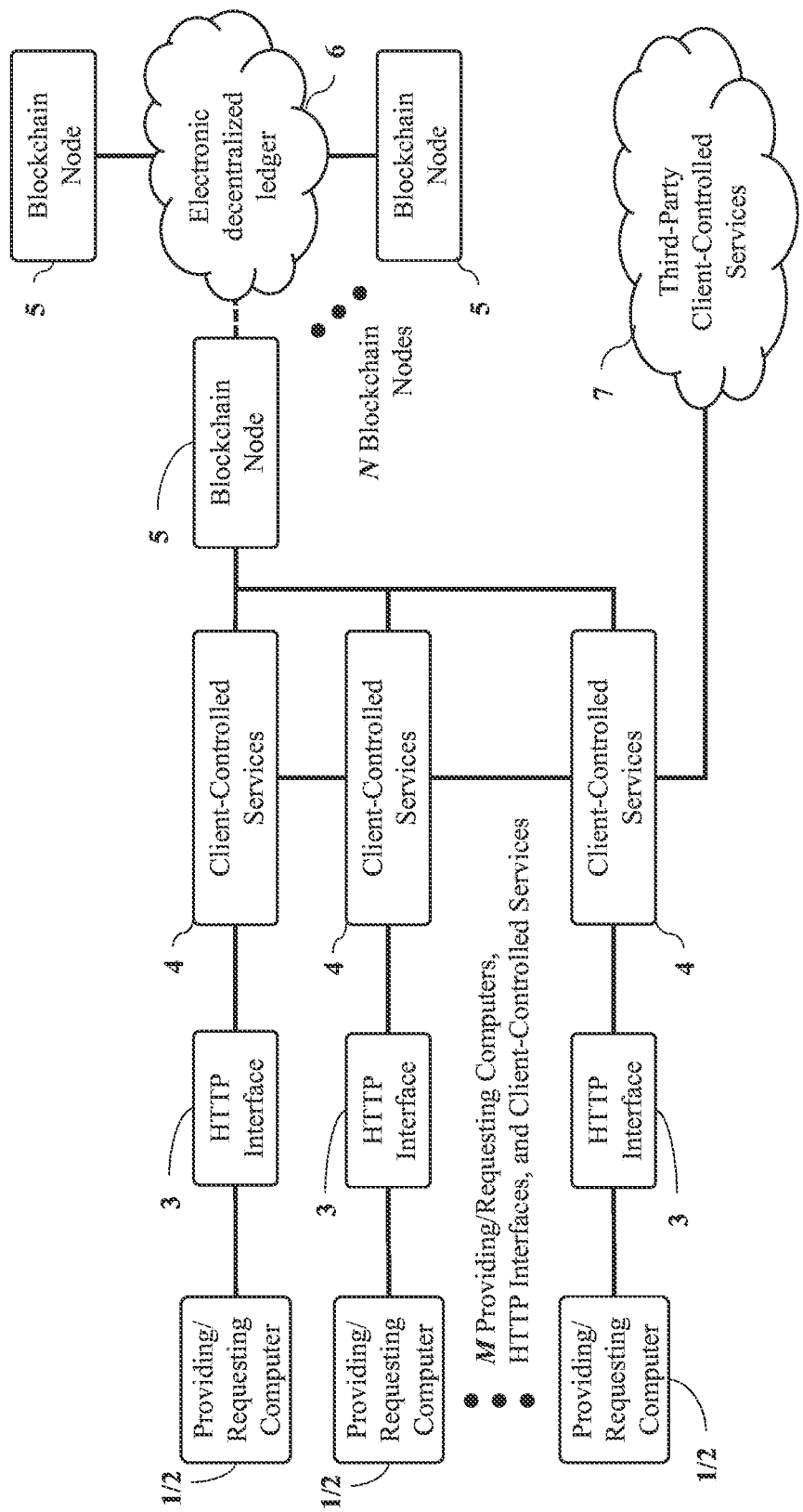
FIG. 1 illustrates an example embodiment a decentralized database system of AI information.

FIG. 1 illustrates an embodiment of a decentralized database system on a computer network in which multiple third-party client computers interact to control, access, and monitor AI information under their individual control. In each interaction, a client computer may act as a providing computer 1 being the source of AI information, as a requesting computer 2 being the requestor gaining access to the AI information, or both—for different aspects of the interaction. The decentralized database system may be used by the providing computer to store and access data for private use, and/or it may be used by two or more client computers in multi-party interactions.

Providing and requesting computers may interact with the decentralized database system through a network interface. In an example embodiment, an HTTP interface 3 is used to accessed via web browser and/or application on the client computer. In other embodiments, this network interface may be a remote or local IP network accessed by another communication protocol and/or application programming interface (API). Such interfaces may utilize standard web protocols for authentication, session management, and encryption of data in transit, etc.

Each providing/requesting computer may utilize a set of client-controlled services 4 for processing, storage, and/or communication of AI information. Each client-controlled service 4 may be provisioned directly by the providing/requesting computer or by a service provider. Furthermore, each client-controlled service 4 may be controlled by the providing/requesting computer such that third party entities other than the providing/requesting computer are unable (or have limited ability) to set or modify the configuration of the service, initiate, control, and/or stop the execution of the service, and/or access the data handled by the service.

Each independently-controlled set of client-controlled services 4 may connect to and exchange information with, under the direction of the providing/requesting computer, other client-controlled services controlled by third party computers (labeled third-party client-controlled services 7 in FIG. 1).

Each independently-controlled set of client-controlled services 4 may subscribe to one or more blockchain nodes 5, each blockchain node 5 being a service controlled and operated by a single computer, group of computers, or a service provider 5. In some embodiments, each blockchain node 5 is configured and operated according to a set of policies approved by a subscribing client computer(s). Such policies may relate to network boundary configuration, system monitoring, validation and consensus settings, access control, etc., and the subscribers to a particular blockchain node may align within a common trust boundary, i.e., a members of a company or government organization, or citizens of a nation subscribing to a blockchain node operated by or on behalf of that organization or nation.

The multiple inter-connected blockchain nodes may execute a set of agreed-upon data communication, validation, and consensus algorithms for maintaining an electronic decentralized ledger 6. The electronic decentralized ledger 6 is a common, trusted, up-to-date, privacy-preserving, auditable record of events and transactions between third parties and a privacy-preserving index of user information, public cryptographic keys, contexts and data standards, cryptographic access capabilities, and AI models and associated data in encrypted data vaults across the network. Some embodiments may include multiple interoperating ledgers, each referencing or incorporating information from the other, and each with a similar set of blockchain nodes and connected client-controlled services and third-party computers.

The system of client computers may implement a data model in which each AI information set may be stored in the decentralized database along with a set of independently defined, yet interoperable metadata. In example embodiments, the data model follows the JavaScript Object Notation for Linked Data (JSON-LD) formalism and may include: a set of machine-understandable contexts and associated vocabularies that define the terminology and data structures of the information, a set of descriptive metadata which self-specify the selected contexts and define according to those contexts the properties of the AI information set, a set of linked-data metadata which self-specify the selected contexts and define according to those contexts a set of relationships between the AI information set and other AI information stored in one or multiple encrypted data vaults, potentially belonging to different owners, or to other information stored on other public or permissioned hosting services. The use of JSON-LD or similar self-specified data model(s) may allow independent client computers to consume and understand information generated by one another without the need for prior coordination or rigorous pre-defined data formats, and these ad-hoc machine-understandable data model(s) may inherently support the evolution of techniques, tools, and data formats used in AI development and/or operation.

Figure 2:
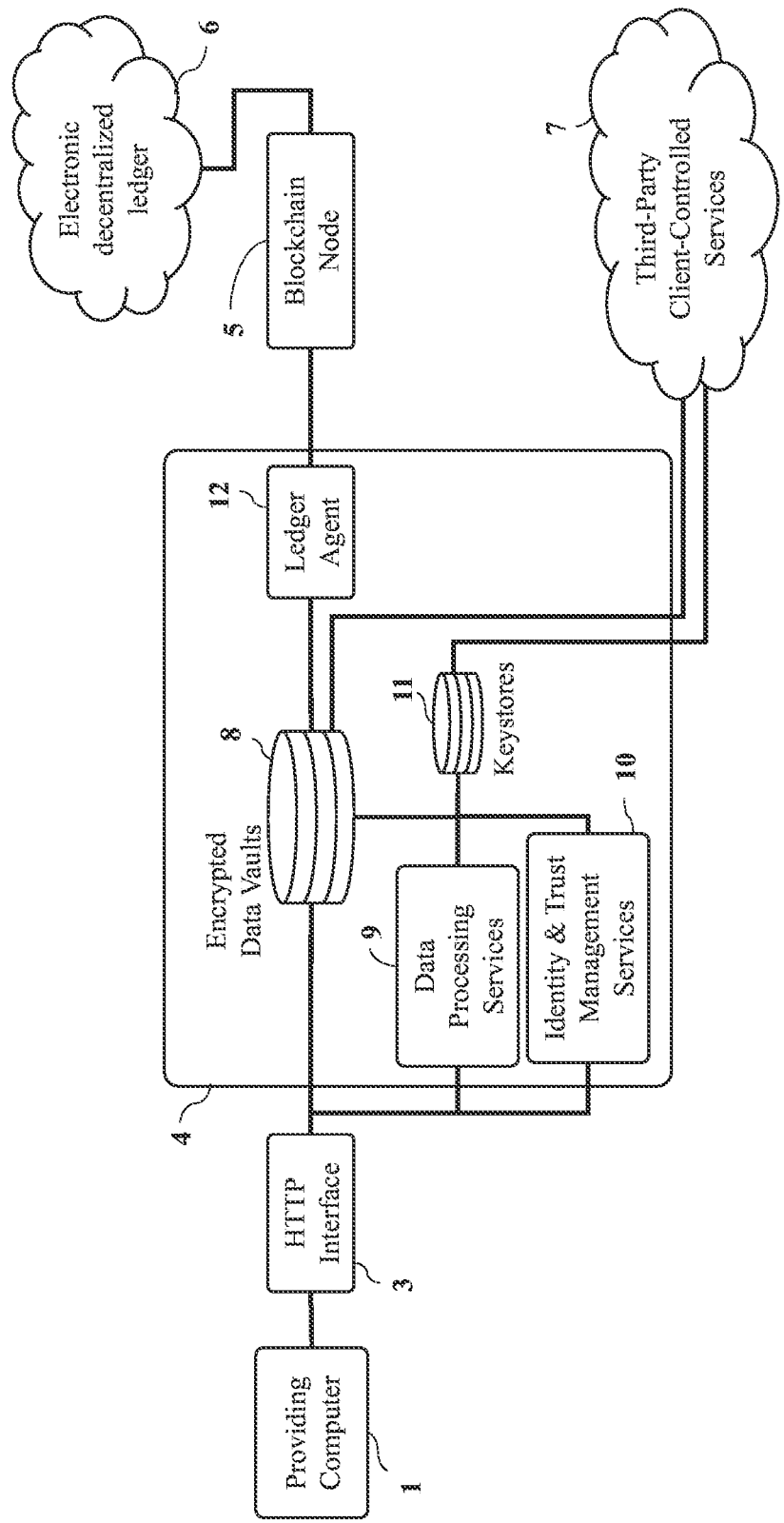
FIG. 2 further illustrates the embodiment configuration of components from the perspective of an individual providing computer.

FIG. 2 illustrates an example embodiment of the decentralized database in more detail and from the perspective of a single providing computer 1, 2. (Note that a computer may act in either a providing or a requesting capacity while maintaining a similar relationship with the set of encrypted data vaults under its control). In this embodiment, the client-controlled services 4 comprise a set of encrypted data vaults 8, each of which acts as an independent data server for the providing computer.

Each encrypted data vault 8 may store in digital storage media AI information, and may assign and manage unique identifiers, version information, and an address to access (e.g., Uniform Resource Locator (URL)) for each independently-stored AI information set. Each encrypted data vault 8 may further comprise an interface that receives and responds to requests from the providing computer and from other third-party computers to create, modify, or access AI information stored by the encrypted data vault.

Each encrypted data vault 8 may further comprise an interface through which the providing computer encrypts AI information prior to upload to the encrypted data vault or as an integral part of the information storage process of the encrypted data vault. In an example embodiment, this encryption is performed by the client computer such that the client computer has control of the encryption keys and such that no third party has access to the encryption keys unless granted by the providing computer.

Each encrypted data vault 8 may further comprise an interface through which the providing computer cryptographically wraps the secret encryption key such that it can be unwrapped and utilized only by a set of recipients specified by the provider computer. In an example embodiment, this is performed with an asymmetric cryptographic key wrapping algorithm, and the process of encryption and wrapping is performed individually for each AI information set so that the providing computer may grant and revoke access to specific AI information sets independently.

Each encrypted data vault 8 may further comprise an interface through which the providing computer generates and issues to specific recipients cryptographic authorization capabilities and through which requesting computers may assert by cryptographic proof of the capability that they were granted access by the providing computer, under certain terms and conditions, to specific AI information set(s) stored in the encrypted data vault. Authorization capabilities may include certain additional security measures, defined during issuing by the providing computer, which must be also meet in order for the requesting computer to be granted access (e.g. time expiration, one-time use, IP address restrictions, etc.). Interfaces issuing and validating authorization capabilities may be configured to support a network of multiple third-party computers managing access permissions without the need of a centrally-maintained access control list, such that the possession of a valid authorization capability and cryptographic proof that it was issued to the requesting computer may be sufficient to establish authorization to access. Interfaces issuing and validating authorization capabilities may be further configured to accept chains of authorization capabilities where an issuer explicitly allows an authorization capability to be delegated by the recipient to one or more levels of additional recipients; and where a delegated capability be validated by validating multiple nested digital signatures and cryptographic hashes.

Encrypted data vaults 8 may be additionally configured to store and control access to provider computer user information, license terms, access records, requests for access to information, and other information that supports the operation of the methods described herein. The providing computer may initiate the provisioning of multiple encrypted data vaults under its control such that each encrypted data vault handles certain types of information or is confined to certain types of access requests or classes of requesting computers/services.

The client-controlled services 4 may further comprise a set of data processing services 9, which may integrate with the encrypted data vault(s) and may be configured by the providing computer to parse, split, and synthesize AI information into atomic units linked together via metadata; store, track, and make available prior versions of AI information; synthesize version history and selectively merge information across versions; verify and interpret cryptographic hashes and digital signatures; package and execute AI models and associated computer code in standard software containers; and/or synthesize, communicate, interpret, and translate between contexts metadata associated with the AI information.

The client-controlled services 4 may further comprise a set of identity and trust management services 10, which may work with the other client-controlled services to generate and manage public and private user information and link user information records to one or more sets of public/private cryptographic key pairs. Events related to the creation and/or update of these records may be posted to the decentralized ledger, and those ledger events may form a privacy-preserving index of decentralized identifiers to which third-party computers may reference authorization capabilities, requests for AI information, and/or AI information. The identity and trust management services may further reference such decentralized identifiers to issue, revoke, and cryptographically validate verifiable credentials statements on behalf of and/or relating to third-party computers or AI information in the decentralized database.

The client-controlled services 4 may further comprise a ledger agent 12, which may be used by the providing computer to generate and submit events to the subscribed blockchain node 5 for posting to the electronic decentralized ledger 6 and to search, fetch, and synthesize the chain of events related to AI information from the decentralized ledger 6.

The client-controlled services 4 may further comprise a set of keystores 11, in which the providing computer may store encryption keys for AI information, cryptographic keys associated with the decentralized identifiers controlled by the providing computer and associated services. In some embodiments, the keystore(s) may be integrated with one or more other client-controlled services; in other embodiments, one or more keystore(s) may be provided by external service provider(s) and configured to communicate with encrypted data vaults and other services via a defined API.

Figure 3:
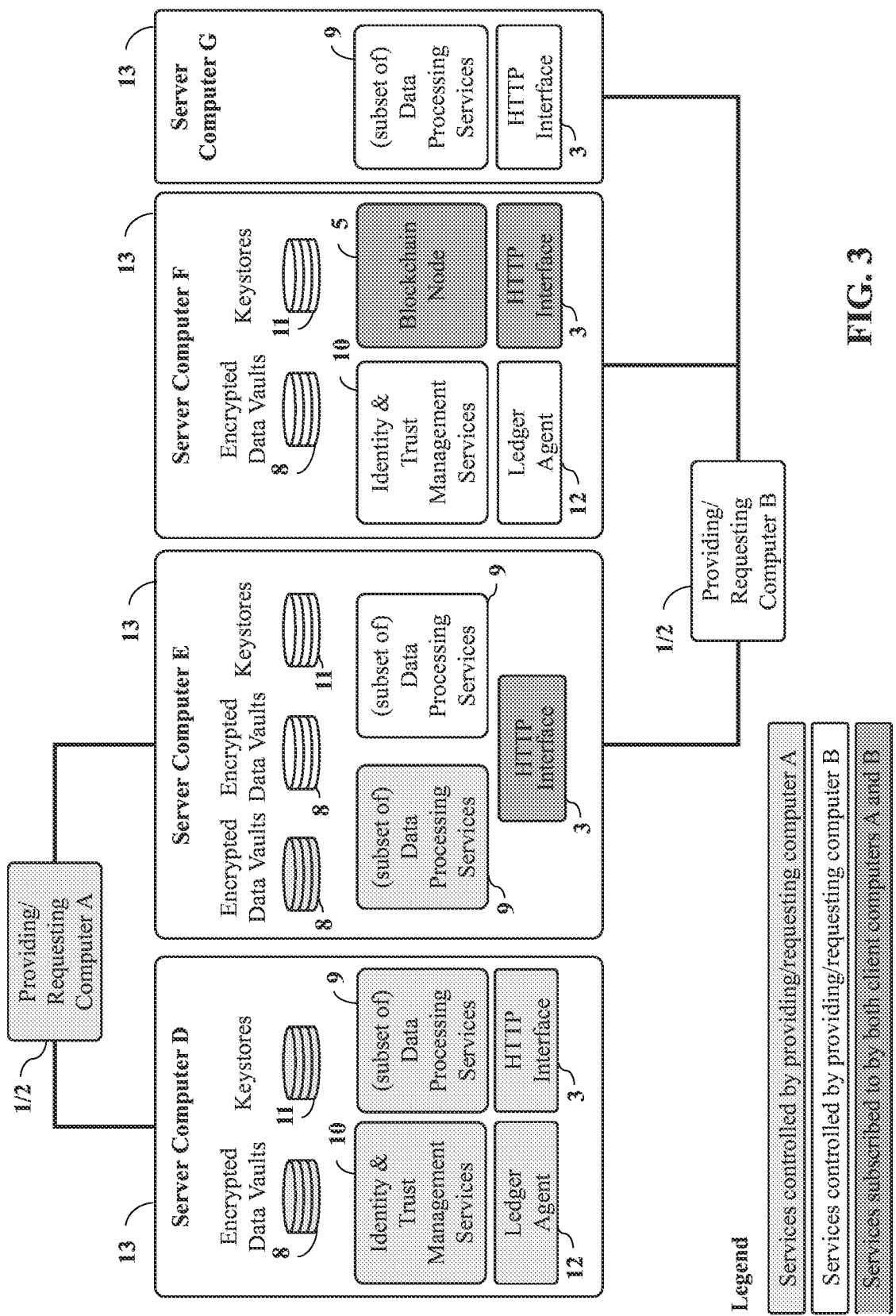
FIG. 3 illustrates the example embodiment shown in FIG. 1 illustrating decentralization of control and distribution in the physical/network topology.

FIG. 3 illustrates an example embodiment of the decentralized database system from the perspective of physical and/or network topology. In addition to being under decentralized control, the decentralized database system may also be distributed across multiple server computers 13 and/or computer networks. The server computers 13 may exist in different data centers or different geographic locations, managed under different configurations (e.g., access rules, firewalls, etc.) on different computer networks or VPNs, and/or may be self-operated or operated by different service providers. This example illustrates a simplified case, but in practice, many client computers may subscribe to services (e.g., maintain encrypted data vaults) on a server computer operated by a service provider.

In this example, the HTTP interfaces 3, blockchain node(s) 5, encrypted data vaults 8, data processing services 9, identity & trust management services 10, keystores 11, ledger agent(s) 12, and other elements of the decentralized database system may be equipped with their own network interfaces and software packaging such that they may be compartmentalized and operated across the various servers in the distributed topology using cloud computing virtualization techniques such as container orchestration. The depiction of some client-controlled services as operating on the same computer server is not required, and virtualization of these services may allow them to be split into numerous configurations across multiple servers connected by one or more computer networks.

Each encrypted data vault 8 may be further virtualized using distributed database techniques to store underlying data in a distributed manner across multiple physical computer servers and/or storage devices (e.g., database sharding).

In this example, two client computers (labeled "A" and "B") are controlling and/or subscribing to decentralized database services hosted across multiple server computers. Providing/Requesting Computer A may operate the majority of its client-controlled services on Server Computer D and may also maintain an additional set of encrypted data vaults and a subset of data processing services on Server Computer E. Providing/Requesting Computer B may operate client-controlled services on multiple other server computer(s) F, G, and including operating some client-controlled services on the same shared Server Computer E. Such a configuration may arise if a subset of the data processing services requires specific computer hardware (e.g., a machine learning algorithm requiring a specialized processing unit) available on Server Computer E. Each providing/requesting computer may access HTTP interfaces or general network interfaces (including accounts, authentication, session management, API endpoints, etc.) on any of the server computers on which it controls or subscribe to services. Both providing/requesting computers may subscribe to a blockchain node operated on Server Computer F.

Storing, Operating, and Updating AI Information in the Decentralized Database

Figure 4:
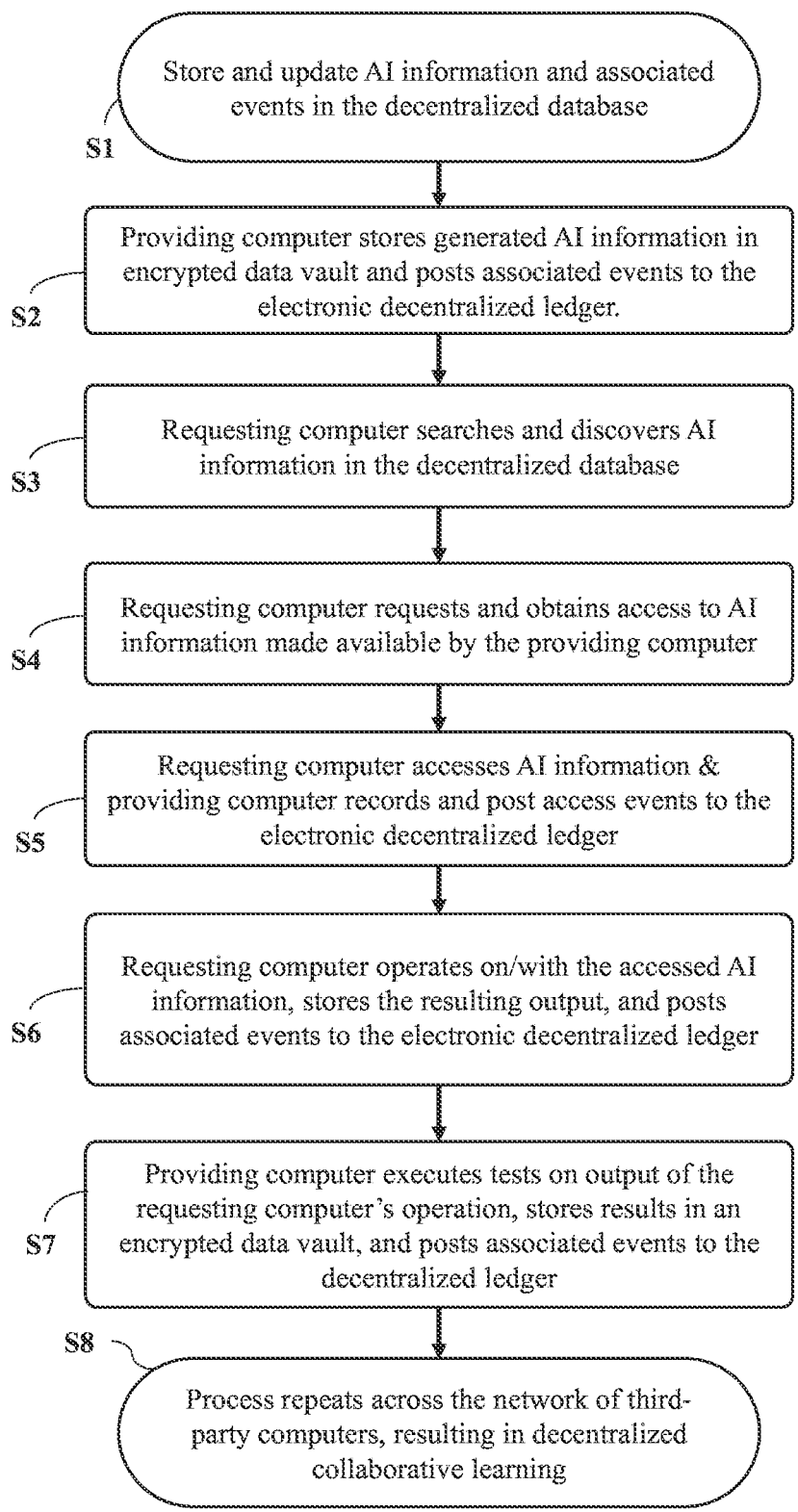
FIG. 4 is a flowchart diagram that illustrates example procedures for storing, accessing, and updating AI information in the decentralized database system of FIG. 1.

FIG. 4 illustrates an example method in which a providing computer and a requesting computer store, access, process, and update AI information and associated events in the decentralized database system including a decentralized ledger (as indicated generally at in step S1). This example is described in terms of two computers, for simplicity: a providing computer and a requesting computer. The providing computer stores generated AI information in an encrypted data vault and posts associated events to the electronic decentralized ledger in step S2; the requesting computer searches and discovers the AI information in the decentralized database in step S3; the requesting computer requests and obtains access to the AI information made available by the providing computer in step S4; the requesting computer accesses the AI information, and the providing computer records and post access events to the electronic decentralized ledger in step S5; the requesting computer operates on/with the accessed AI information, stores the resulting output, and posts associated events to the electronic decentralized ledger in step S6; and the providing computer executes tests on output of the requesting computer's operation, stores results in an encrypted data vault, and posts associated events to the decentralized ledger in step S7. These steps S2-S7 may be repeated or extended across the network of client computers, resulting in a decentralized method for collaborative learning, AI model operation, and/or secure AI data aggregation as indicated at step S8.

Storing AI Information & Making it Available in the Decentralized Database

Figure 5:
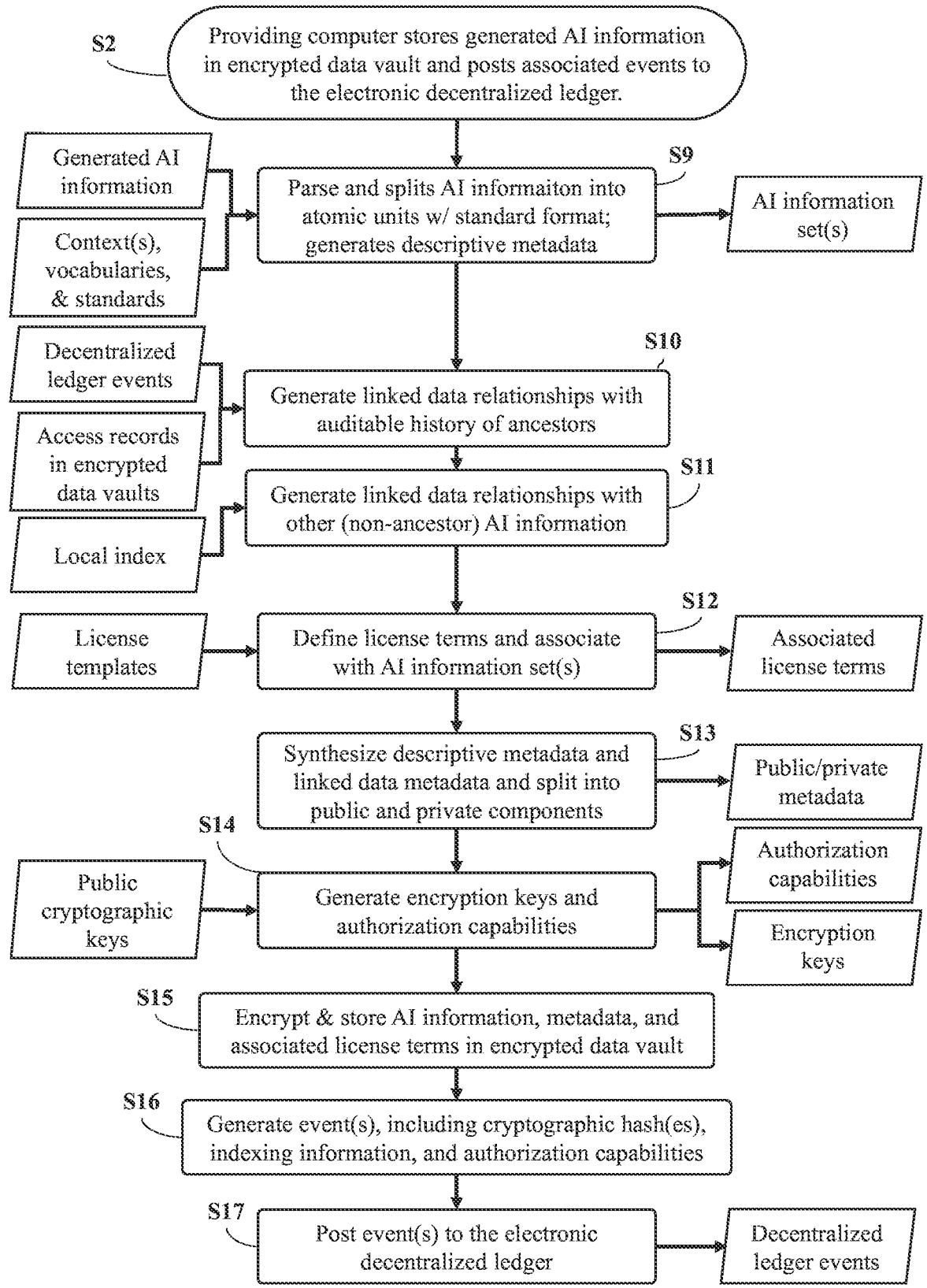
FIG. 5 is a flowchart diagram illustrating example detailed operations for implementing step S2 in FIG. 4 relating to a providing computer storing AI information in an encrypted data vault and posting associated events to the electronic decentralized ledger in the example embodiment of FIG. 1.

The providing computer follows an example method shown in FIG. 5 to generate and store AI information in an encrypted data vault under its control and uses encrypted data vault and ledger agent services to automatically post associated events to the decentralized ledger to implement step S2 in FIG. 4. Other implementation methods may be used.

A context or set of contexts, containing definitions and/or links to definitions of data structures, terminology, etc., is selected from available options hosted publicly on the blockchain and encrypted data vaults or on other public websites. The generated AI information is then parsed, formatted (e.g., into Protocol Buffers, etc.), and split into atomic AI information sets in step S9, with descriptive metadata for each AI information set following the selected context(s) being generated via inputs from the providing computer and by client-controlled services. Examples of descriptive metadata for each AI information set include descriptions of: the entities who generated the information, the conditions under which it was generated, its intended purpose and/or alternate uses, instructions for usage, caveats, prerequisite and/or peer requirements for usage, dependencies and/or links to access those dependencies from external, public, and/or open-source repositories, credits and/or funding sources, general notes and/or comments, etc.

The providing computer accesses events on the decentralized ledger and metadata in one or more encrypted data vaults to generate an auditable history of prior versions (ancestors) of the generated AI information in step S10, and to identify and define linked-data relationships to other (non-ancestor) AI information sets in step S11, including URLs to the other AI information.

In some example embodiments, the providing computer may define, starting from a set of license templates, terms under which requesting computers may license the generated AI information and incorporates URLs and cryptographic hashes of the license terms into the linked data metadata of the AI information in step S12. Example license terms may relate to payment, (non-)distribution, (non-)disclosure, academic vs. commercial use, and/or agreement to dispose of information under certain conditions. Such license terms may further incorporate sub-licenses from ancestors of the generated AI information according to the cascading license terms defined for those ancestor AI information sets.

The various elements of descriptive and linked-data metadata are synthesized for each AI information set and split into public and private metadata components in step S13 so that the public metadata components are made available by the encrypted data vault and access to the private metadata components is restricted by the encrypted data vault.

The providing computer defines access permissions, which may include selected recipients, permission level (read, write, manage, etc.), and conditions (expiration time, one-time access, additional security constraints, ability to delegate permissions to others, etc.). These access permissions are incorporated into cryptographic authorization capabilities, which are issued to those selected recipients along with a set of unique encryption keys for information storage in step S14. Authorization capabilities and encryption keys may be addressed to each recipient by referencing the recipients' decentralized identifiers and/or public cryptographic keys on the decentralized ledger. Encryption keys may be generated for use with a cipher specified in the information owner's configuration (in an example embodiment this is a symmetric cipher which is specified in the context), and then both the private metadata and underlying information may be independently encrypted using the keys and cipher. In an example embodiment, this encryption is performed in the client prior to communication over the cloud infrastructure to the encrypted data vault. Cryptographic storage keys may be wrapped with an agreed-upon "key wrap" cipher using key values computed from the set of recipient keys such that each of the intended recipients may "unwrap" the encrypted storage key using the private half of their recipient key pair.

The set of information and cryptographic objects (public metadata, encrypted private metadata, encrypted underlying AI model or associated data, wrapped storage keys, and authorization capabilities) is uploaded to the encrypted data vault and stored in encrypted form in step S15. The encrypted data vault may attribute a unique storage identifier and versioning information to the information uploaded. Because it is encrypted, and access is controlled by authorization capability, private metadata and AI information may include sensitive information, such as the time and location where a data set was collected or the history of development or training of an AI model, or the contents of the AI model or dataset themselves.

To implement additional levels of access control, the providing computer may add additional levels of authorization capabilities or add additional requirements on authorization capabilities (e.g., consent acknowledgement and digital signature) that the requesting computer must possess or meet in order to access additional levels of private metadata or the AI information set itself.

An event (or set of events) indicating the creation or update of the AI information is generated at step S16. In an example embodiment, each event includes indexing information, cryptographic hashes, and authorization capabilities relating to the generated AI information. In some alternate embodiments, authorization capabilities are communicated using other techniques such as the secure messaging methods described in step S29). Furthermore, in an example embodiment, each indexing record contains a minimum set of publicly-available indexing information related to the AI information stored in the encrypted data vault, including: one or more contexts, a unique identifier (UID), an event type, a created timestamp, an owner UID, a content URL, a content type, a content hash, a set of encrypted authorization capabilities, and a digital signature. By limiting events on the decentralized ledger to a minimum amount of indexing information, this example embodiment stores sensitive or valuable data (e.g., PII, AI information, etc.) in encrypted data vaults where it can be controlled and protected. It may be desirable not to store sensitive information on the decentralized ledger because the immutable nature of the ledger makes it difficult to redact or withdraw such information. But in an encrypted data vault, the information may be deleted or access withdrawn by the encrypted data vault's controller. In a further example embodiment, validators are operated as part of the identity & trust management services 10 to monitor and prevent a client computer from accidentally exposing personal or sensitive information to the decentralized ledger 6.

The providing computer ledger agent 12 then validates and submits the event for posting to the electronic decentralized ledger in step S17, where the event may be come accessible to third party computers as evidence and useable as an index to access the generated AI information.

Figure 6:
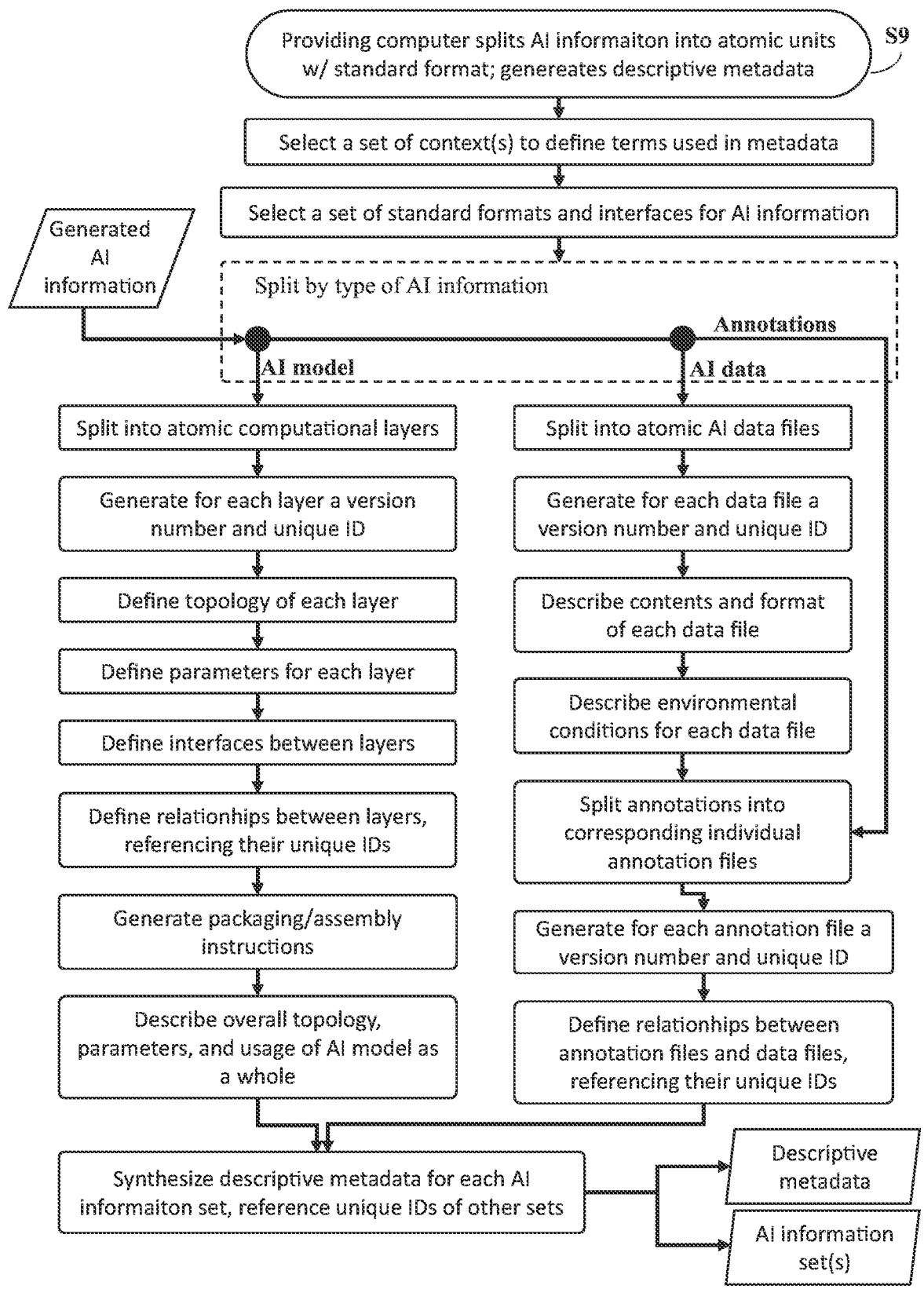
FIG. 6 is a flowchart diagram illustrating example detailed operations for implementing step S9 in FIG. 5 relating to a providing computer splitting AI information into atomic units and generating descriptive metadata prior to storage in an encrypted data vault.

FIG. 6 illustrates an example implementation for step S9 in FIG. 5, where the providing computer and data processing services split the generated AI information into atomic units called AI information sets. The providing computer selects a set of context(s) to describe the data, and then selects and initiates by the data processing services the packaging of the any AI models, data, and/or annotations into standard format(s) which may be executed directly (in the case of models) or ingested by an AI computation tool. The generated AI information is then split into atomic units using methods based on its type (AI model, AI data, and associated annotations).

AI models are split into atomic computational layers, for which each is generated a version number and unique ID. The providing computer defines the topology and parameters for each layer, the interfaces between layers, and the relationships between layers, referencing the unique IDs of each. The providing computer then generates instructions for assembly and packaging of the layers as a cohesive AI model and describes the overall topology, parameters, and use of the AI model as a whole.

AI data are split into atomic data files or sets of data files (e.g., individual images, text snippets, sound files, etc.), for which each is generated a version number and unique ID. The providing computer defines the contents and format of each data file and describes the environmental conditions under which each data file was collected. Any annotations associated with the AI data are split into individual annotation files in a standard format (e.g., YAML, JSON, etc.) corresponding to the individual AI data files, and a version number and unique ID are generated for each. The providing computer then defines relationships between the AI data files and the annotation files, referencing the unique IDs of each.

The providing computer and data processing services synthesizes the information generated in the preceding steps into descriptive metadata for each AI information set, referencing the unique IDs of other AI information sets encompassed by this operation. Formatting the generated AI information and synthesizing the descriptive metadata in this way results in a set of contributions to the decentralized database that can be immediately understood and interpreted by requesting computer services, split apart, re-ordered, merged with other AI information sets, or selectively modified at the level of individual computational layers, data files, or annotation files.

Figure 7:
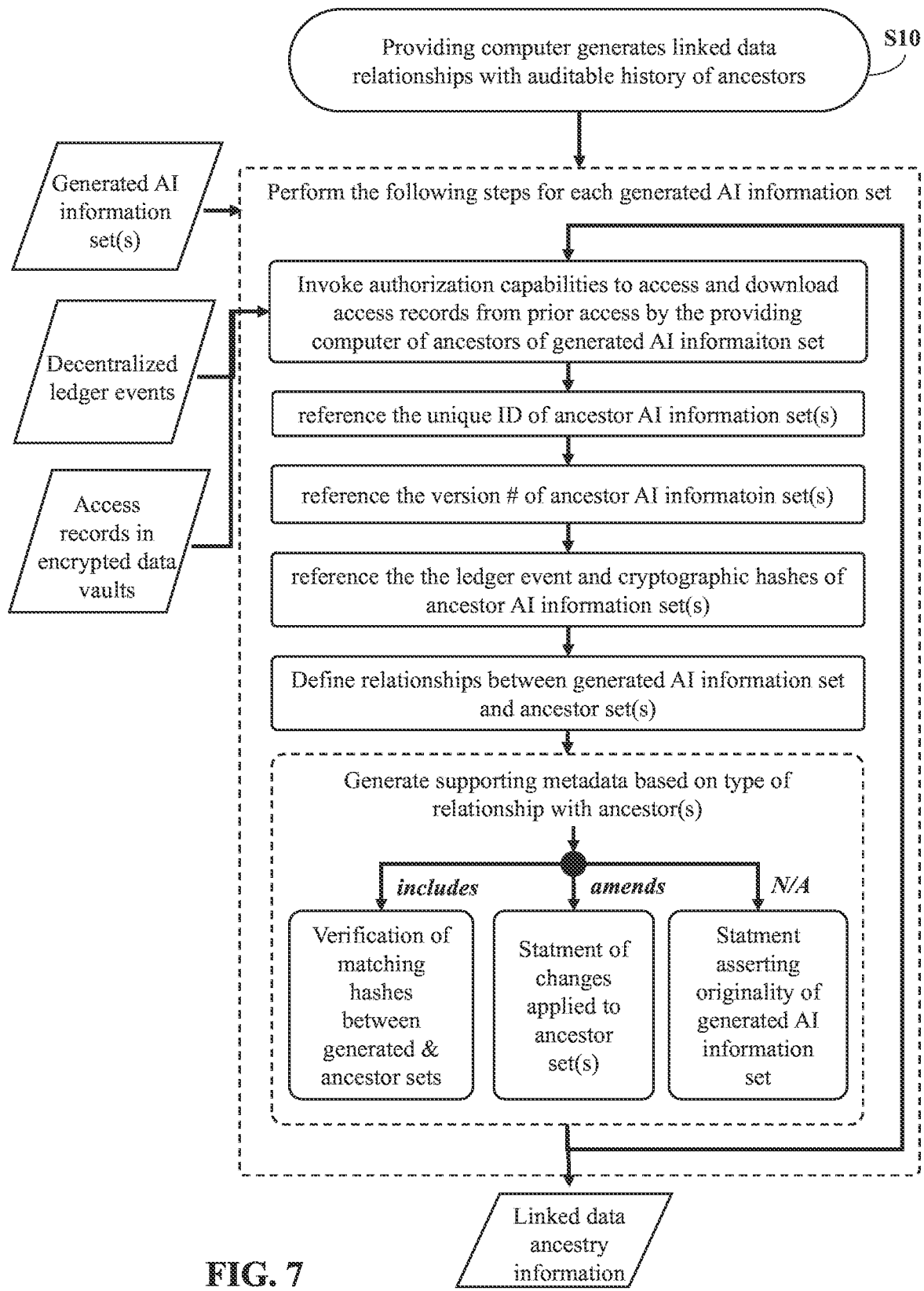
FIG. 7 is a flowchart diagram illustrating example detailed operations for implementing step S10 in FIG. 5 relating to a providing computer generating a set of linked data relationships and an auditable history of ancestors of the generated AI information.

FIG. 7 further illustrates example procedures for implementing step S10 in FIG. 5, where the providing computer generates linked data relationships of each of the generated AI information sets, including an auditable ancestry for each. For AI information sets which were sourced or modified from a prior version, the providing computer and data processing services may invoke authorization capabilities to access, download, and decrypt the access records pertaining to ancestors of the generated AI information set. These access records may be hosted in an encrypted data vault of the providing computer of that ancestor information (which may be the current providing computer or may be other third party providing computers). In some example embodiments, these access records may have already been downloaded immediately upon access. The providing computer may then generate linked data metadata by referencing the unique ID of the ancestor(s), the version number of the ancestor(s), and/or the relationship with the ancestor AI information set. Here are some example relationships: (1) "includes" denotes that the ancestor is included un-modified, (2) "amends" indicates that the ancestor has been modified, and (3) "N/A" indicates that the AI information set has no ancestors. The providing computer may then reference the ledger event associated with the correct version of the AI information set and incorporate the cryptographic hash of the ancestor AI information set from the ledger event.

For all generated AI information sets (with or without prior ancestry), the providing computer may then synthesize the above information into a set of supporting metadata, with certain information based on the type of relationship with the ancestor(s). Example supporting metadata are: (1) for "includes," the providing computer may compute a hash of the generated AI information set and verify that it matches the hash of the ancestor set, (2) for "amends," the providing computer may generate a statement describing changes applied to the ancestor set, (3) for "N/A," the providing computer may generate a statement asserting that the generated AI information set is original and has no ancestors. In an example embodiment, these statements may be incorporated into the linked data metadata and digitally signed as part of the ledger event associated with the generated AI information set. Furthermore, this process may be automated as part of the client-controlled services, requiring that the providing computer make verifiable statements about the authenticity of its data prior to submission to the decentralized database. This, along with the verifiable credentials, may form the basis of a "trusted AI information" or "trusted AI information provider" certificate useable for community enforcement of license rules.

Figure 8:
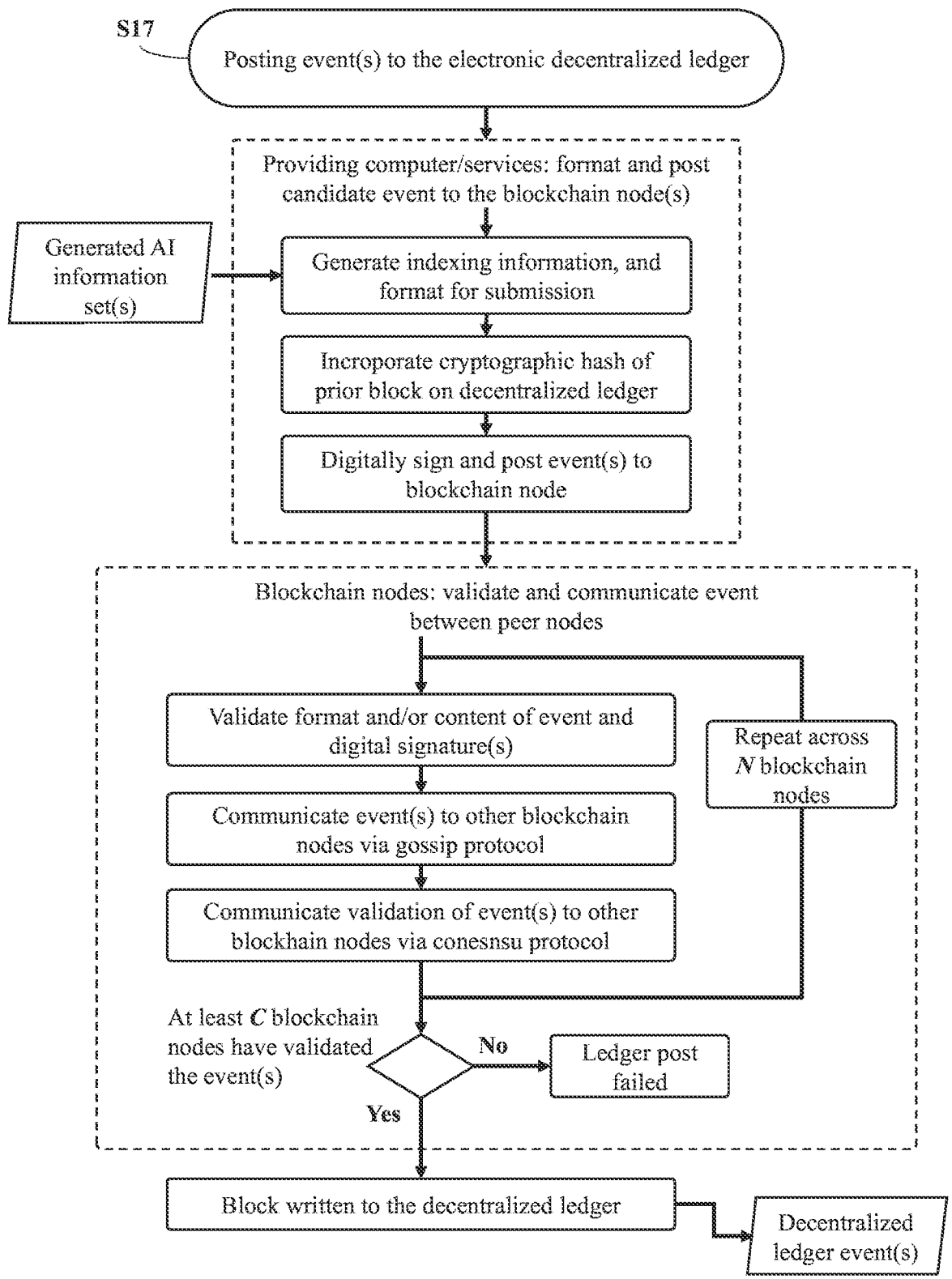
FIG. 8 is a flowchart diagram illustrating example detailed operations for implementing step S17 in FIG. 5 relating to a providing computer initiating posting of events associated with the generated AI information to a decentralized ledger.

FIG. 8 illustrates an example technique for implementing step S17 in FIG. 5, where the providing computer initiates posting of events associated with the generated AI information to the electronic decentralized ledger 6. The providing computer and ledger agent 10 may format indexing information generated for the AI information set(s), compute and incorporate into the event(s) a cryptographic hash of the generated AI information set(s), digitally sign the event with a private cryptographic key corresponding to its decentralized identifier, and submit the event(s) to a blockchain node 5. Each blockchain node in the network may then iteratively validate the format and/or content of the event and the digital signature, communicate the event(s) to other blockchain nodes via an agreed-upon gossip protocol, and communicate validation of the event(s) to other blockchain nodes via an agreed-upon consensus protocol. When a pre-configured number of blockchain nodes C have validated the event(s), the decentralized ledger 6 may have reached consensus, and the event(s) may then be formulated into a block. Other ledger agents 10 may then be configured to access and trust the event(s) as being validated information, and the blockchain may serve as an immutable record of the occurrence of the event(s) and the order in which they occurred relative to other events.

Figure 9:
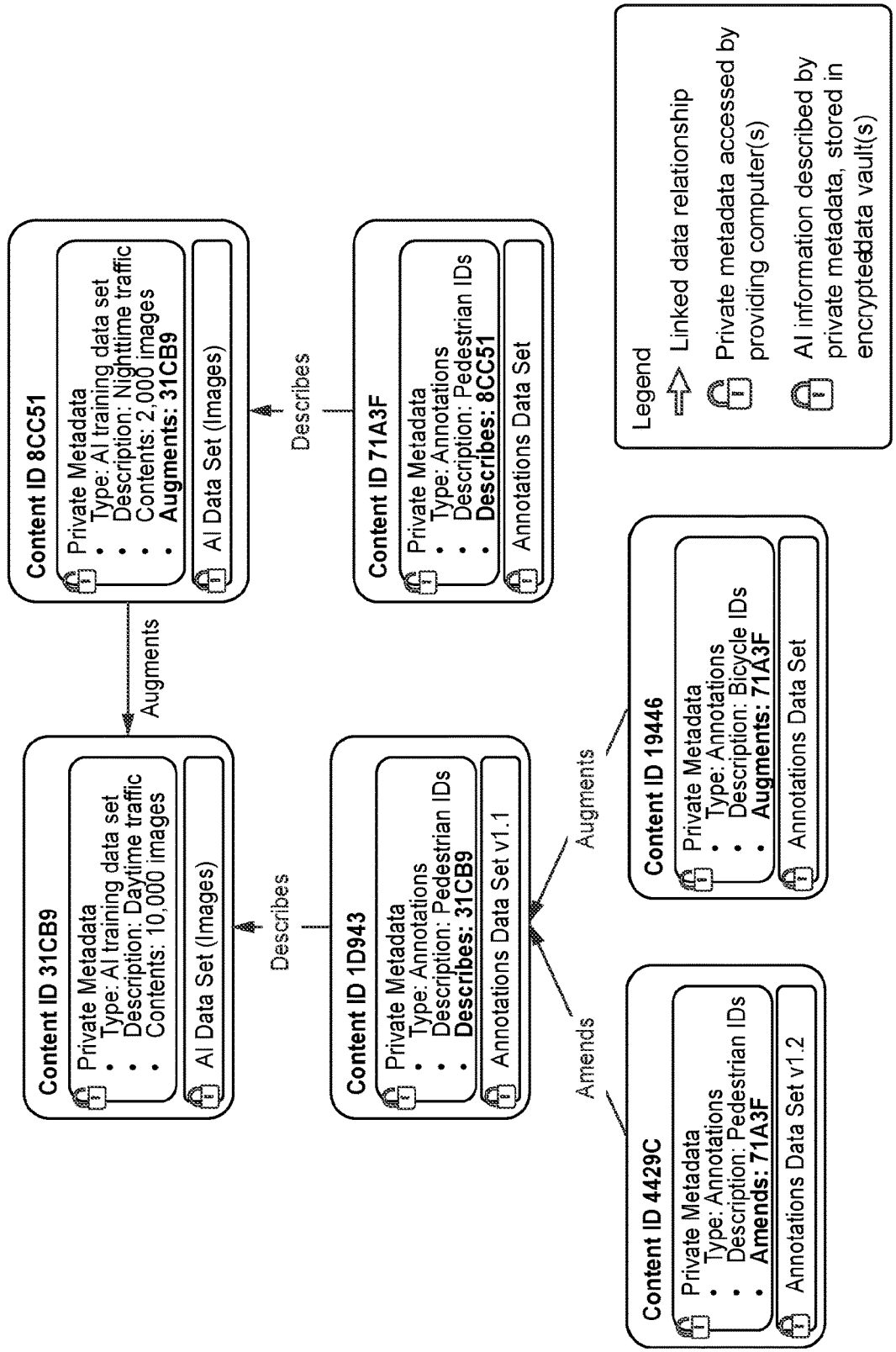
FIG. 9 illustrates an example output resulting from a providing computer generating a set of AI data and annotations with relationships to other AI information sets in the decentralized database.

FIG. 9 illustrates an example data output resulting from multiple iterations of step S2, in which the providing computer generates and stores multiple sets of AI training data and annotations with defined relationships to other AI training data in third-party encrypted data vaults throughout the decentralized database system. In this example, each AI information set is represented by a Content ID, a type of unique identifier relating specifically to the information set in the encrypted data vault. Other types of unique IDs and other metadata may be used.

In this example, the providing computer adds AI information sets 8CC51 and 71A3F to the decentralized database by storing them in an encrypted data vault and linking them to existing AI information set 31CB9, which may be controlled by another party and stored in another encrypted data vault. AI information set 8C551 provides a set of 2,000 traffic images, taken at night, to augment the existing set of 10,000 daytime images in 31CB9, and therefore the providing computer generates an "augments" linked data relationship in the uploaded metadata. AI information set 71A3F contains annotations relating to the 2,000 nighttime images, in which the locations of pedestrians in each image are specified. A linked data relationship indicates that 71A3F "describes" the 2,000 nighttime images in 8CC51.

In this example, the providing computer then generates 1D943 to include pedestrian annotations for the 10,000 daytime images in 31CB9. A linked-data relationship is included in the metadata during, indicating that the annotation data set "describes" 31CB9.

In this example, other providing computers generate further linked data relationships, connecting additional updates or new AI information sets so that they can be discovered, and their relationships understood. Another providing computer generates an enhanced annotation set 4429C that groups the pedestrians into different classifications (e.g., on the sidewalk, in the road, tall, short, etc.), and that providing computer links the enhanced annotation set 4429C to its ancestor 1D943 via the "amends" relationship. This other providing computer also generates a new set of annotations, identifying bicycles in the set of 10,000 daytime images. This bicycle annotation set is stored with Content ID 19446 and its metadata indicates that it "augments" 1D943. Requesting computers may understand from the chain of relationships that the bicycle annotations augment the pedestrian annotation set, and that both describe the set of 10,000 daytime traffic images.

Searching & Discovering AI Information

Figure 10:
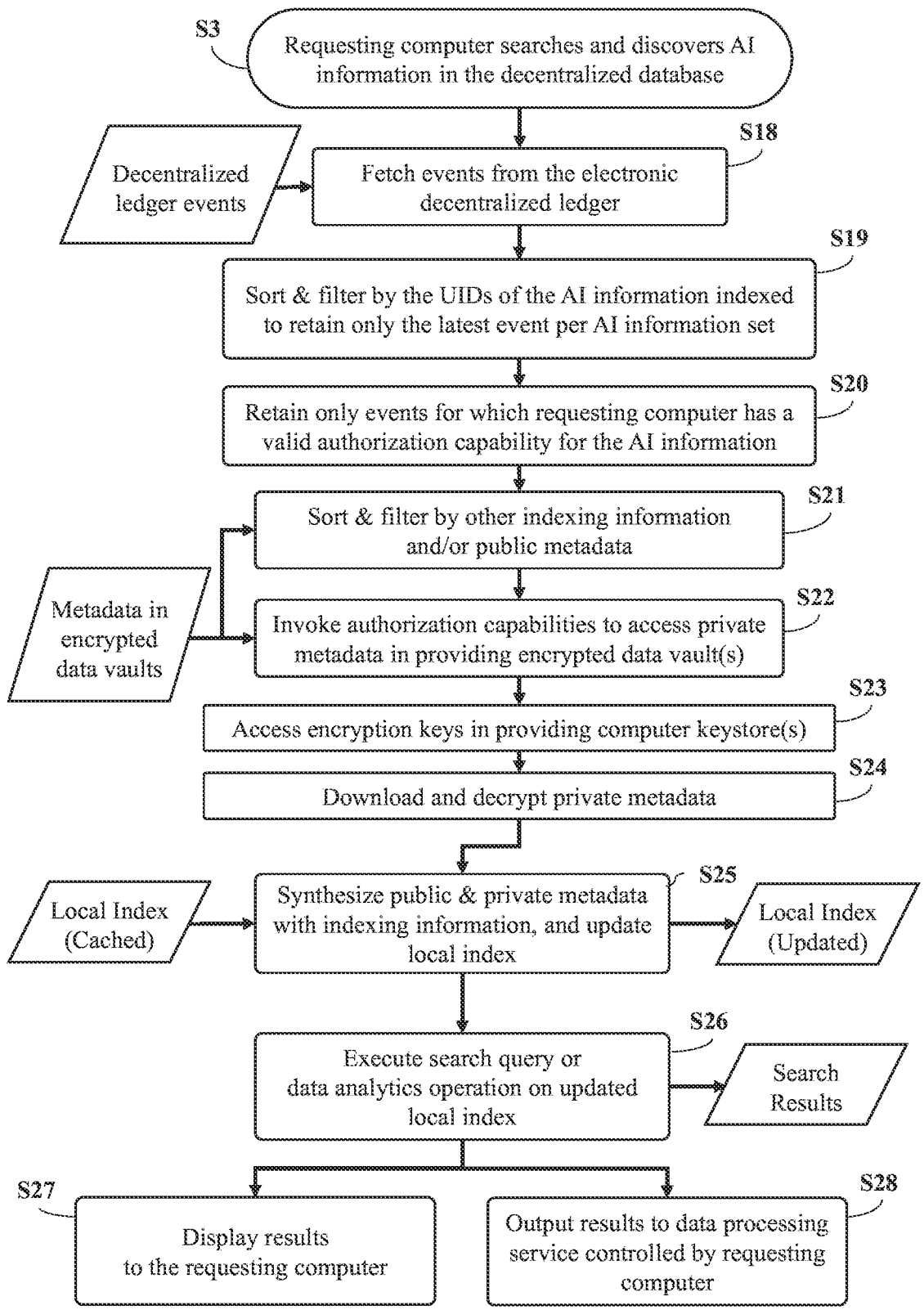
FIG. 10 is a flowchart diagram illustrating example detailed operations for implementing step S3 in FIG. 4 relating to a requesting computer searching and discovering AI information in the decentralized database.

The requesting computer searches and discovers AI information in the providing computer encrypted data vault as indicated in step S3 of FIG. 4. An example implementation of step S3 is illustrated in FIG. 10 described below.

The requesting computer fetches, via its ledger agent, recent events from the decentralized ledger in step S18, sorts and filters those events by the unique IDs (UIDs) of the AI information sets represented (depicted by "Content ID" in the example of FIG. 9), and retains the latest ledger event for each AI information set in step S19. The requesting computer further filters the information to extract only events relating to AI information sets for which the requesting computer has a valid authorization capability in step S20. In an example embodiment, these authorization capabilities are fetched from encrypted data objects stored in the decentralized ledger event(s). In other example embodiments, indexing information and/or cryptographic hashes related to the authorization capabilities may be stored on the decentralized ledger and the authorization capabilities themselves may be communicated by other means and stored elsewhere (e.g., by secure message and in encrypted data vaults, respectively).

The requesting computer then accesses in the corresponding third-party encrypted data vaults the public metadata associated with the AI information indexed by the decentralized ledger events, and may further sort and filter by that information in step S21. The requesting computer further invokes authorization capabilities to access the private metadata associated with these AI information sets and ledger events in step S22, accesses and unwraps the encryption keys in the keystores of the providing computer(s) of the AI information set(s) in step S23, and downloads and decrypts into plaintext the private metadata in step S24. In an example embodiment, this decryption is performed on the requesting computer (e.g., in a web browser) such that the private metadata is transmitted between the encrypted data vault server computer and the client computer in encrypted form.

The requesting computer then synthesizes the plaintext public and private metadata with the indexing information of each AI information set and ledger event and then incorporates that information into a local index maintained by the requesting computer in step S25. The local index represents an up-to-date map of the portion of the decentralized database which is accessible to the requesting computer. In an example embodiment, this local index is maintained and stored in a requesting computer encrypted data vault.

Once the local index has been updated, the requesting computer may then perform various search queries, filtering, visualization, or data analytics operations on the information in the local index in step S26. This is more efficient than accessing the decentralized ledger for every search operation, and the local index, being writable by the requesting computer, provides the requesting computer with a mechanism to make private, customized notes or categorizations of information in the decentralized database (e.g., favorite AI information sets, AI information sets to ignore, additional notes or descriptions generated after review of the metadata, etc.). The requesting computer then generates a visualization and displays the results to the user in step S27, or it may output the results to a data processing service controlled by the requesting computer in step S28.

The example embodiment's use of JSON-LD or other self-described metadata conventions enables the requesting computer to execute search and/or analytics algorithms with data that was generated by different parties with different conventions for describing information or relationships between elements. These parties may use the decentralized ledger or third-party libraries of publicly-available information to define and coordinate a common vocabulary and/or other semantic data standards.

Figure 11:
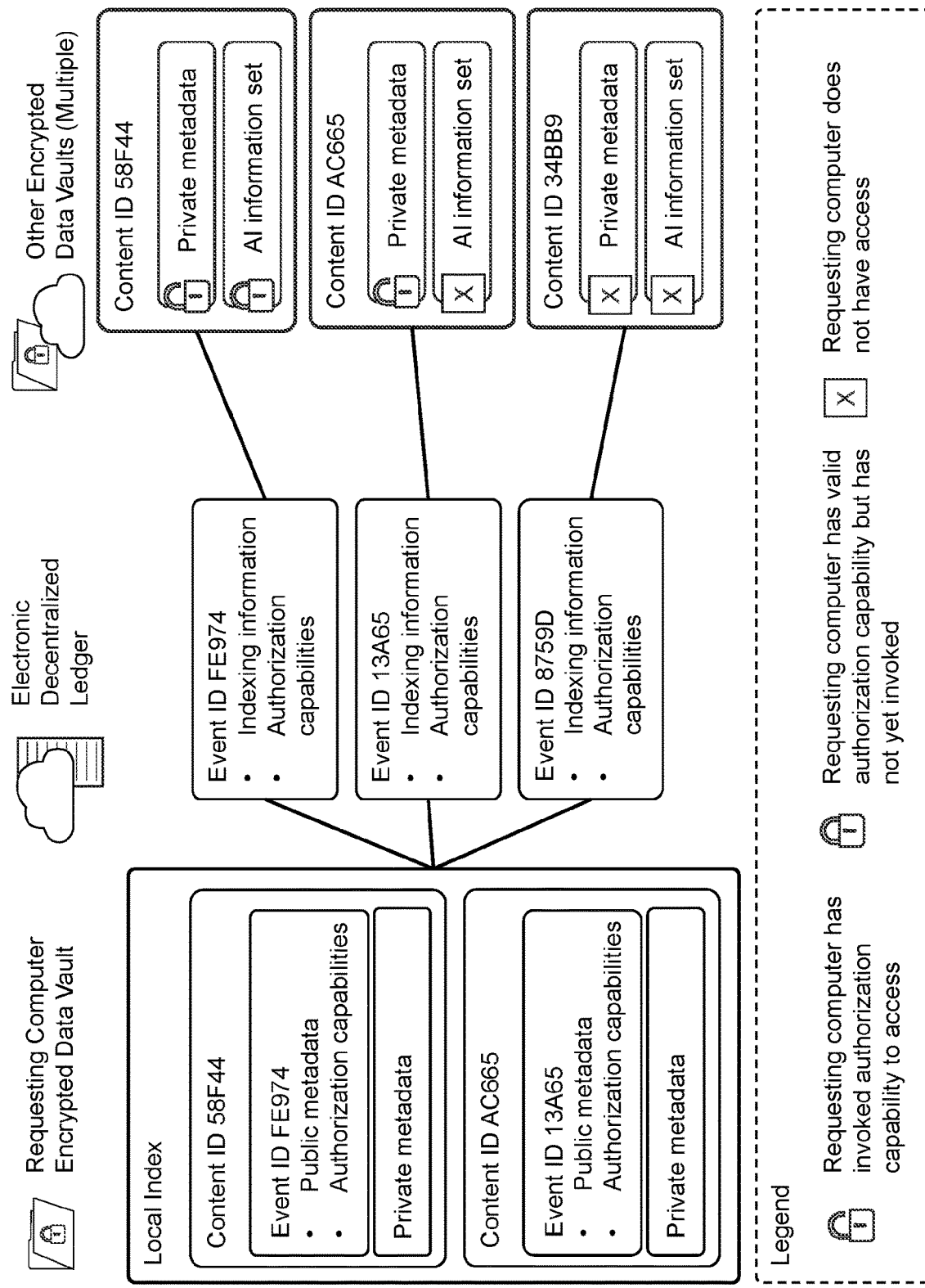
FIG. 11 illustrates an example output resulting from a requesting computer searching the decentralized database and updating a local index of information.

FIG. 11 illustrates an example data output resulting from step S3, in which the requesting computer local index represents a map of the decentralized database including only information which is accessible to the requesting computer (e.g., public metadata or private metadata accessed via authorization capability). In this example, each AI information set is represented by a Content ID, and each decentralized ledger event is represented by an Event ID, being types of unique identifier relating specifically to the information set in the encrypted data vault or the ledger event, respectively. (Other types of unique IDs and other metadata are implied by the figure but not specifically called out).

The local index includes information, grouped by the Content ID of the AI information set(s) and including ledger events, public and private metadata, authorization capabilities, local notes, etc.). These local index entries include links that point to specific events on the decentralized ledger (Event IDs), the contents of which events include links to the AI information sets and metadata in one or more encrypted data vaults under the control of one or more other parties. The unlocked icons indicate that the requesting computer has accessed encrypted information (e.g., private metadata) in a providing computer encrypted data vault. The locked icons indicate that the requesting computer possesses an authorization capability but has not yet accessed the encrypted information. The "X" icons indicate that the requesting computer does not have access to the information. In an example embodiment, the requesting computer does not attempt to index or display information for which it does not have access (only the public metadata associated with Content ID 34BB9 would be shown in this case).

Furthermore, in an example embodiment, the public and private metadata and the AI information set represent multiple levels of access control, defined by the providing computer(s) and utilized by the requesting computer. In this example, the providing computers have allowed any requesting computer to access the public metadata associated with the AI information set, and have further allowed any requesting computer with an authorization capability to access the private metadata. Under this model, the providing computer has essentially granted permission for select requesting computers to automatically access, decrypt, and store local copies of the private metadata as part of a search or automated indexing operation. This does not necessarily grant the requesting computer access to the AI information set; nor does it encourage the requesting computer to automatically download the AI information set.

Requesting & Obtaining Access to AI Information

Figure 12:
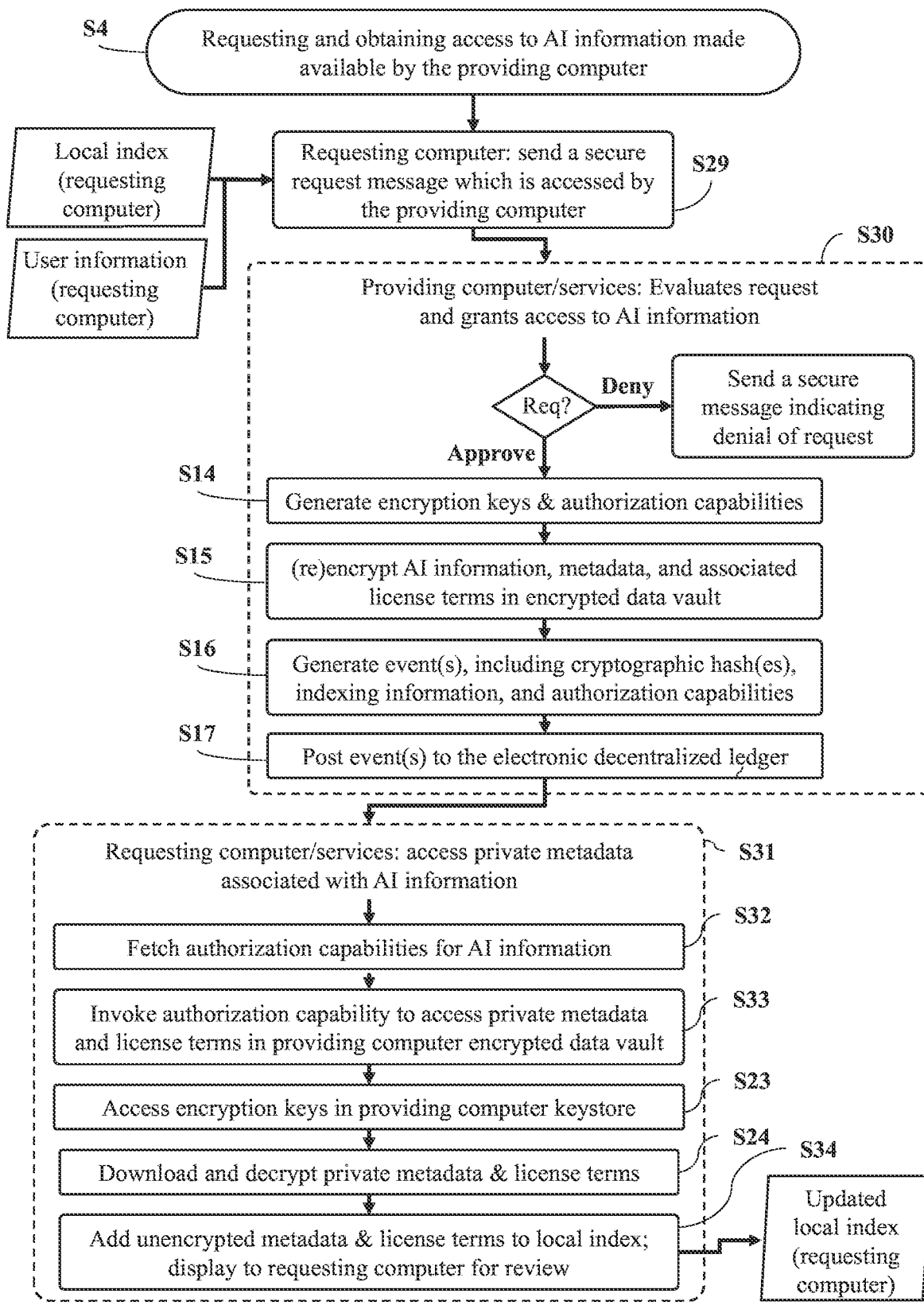
FIG. 12 is a flowchart diagram illustrating example detailed operations for implementing step S4 in FIG. 4 relating to a requesting computer requesting and obtaining access to AI information made available by a providing computer.

Continuing the example in FIG. 4, the requesting computer requests and obtains access to AI information in the providing computer encrypted data vault in step S4. An example implementation of step S4 is illustrated in FIG. 12.

The requesting computer, in this example being aware of the existence of the AI information set based on public metadata, generates and sends a secure request message to the providing computer using encrypted data vault, authorization capability, and decentralized ledger technologies in step S29. The providing computer then access the secure request message, evaluates the request, and either grants or denies access based on its contents in step S30. This request message may include the unique identifier(s) of the requested AI information, user information from the requesting computer, and/or other notes or instructions intended for the providing computer.

If approved, the providing computer generates encryption keys and authorization capabilities for the requested AI information set(s) in step S14 and then re-encrypts information in the providing computer encrypted data vault S15. In some embodiments, this may involve re-wrapping the original encryption keys with an updated key wrap that is accessible by the new requesting computer; in other embodiments, this may involve re-encrypting the AI information sets, associated metadata, and/or associated license terms, re-wrapping the new encryption keys, and re-issuing authorization capabilities to existing holders. Once this re-encryption has been completed, the providing computer generates ledger events, including updated cryptographic hashes, indexing information, and authorization capabilities related to the requested AI information sets in step S16. The providing computer then initiates the posting of these event(s) to the decentralized ledger in step S17.

In an example embodiment, the providing computer may store a copy of each authorization capability issued, along with its status, in an encrypted data vault, to support the option for the providing computer to revoke the authorization capability later.

The requesting computer, observing that a new event has been posted to the decentralized ledger, then accesses the private metadata associated with the requested AI information in step S31 through the following sub-steps: fetching from the ledger event authorization capabilities for the AI information (including private metadata, license terms, and AI information sets) in step S32, invoking authorization capabilities to access the private metadata and license terms in the providing computer encrypted data vault in step S33, accessing and unwrapping the encryption keys in the providing computer keystore in step S23, downloading and decrypting the private metadata and license terms in step S24, and adding the relevant metadata and license information to the requesting computer local index and displaying to the user for review in step S34.

Figure 13:
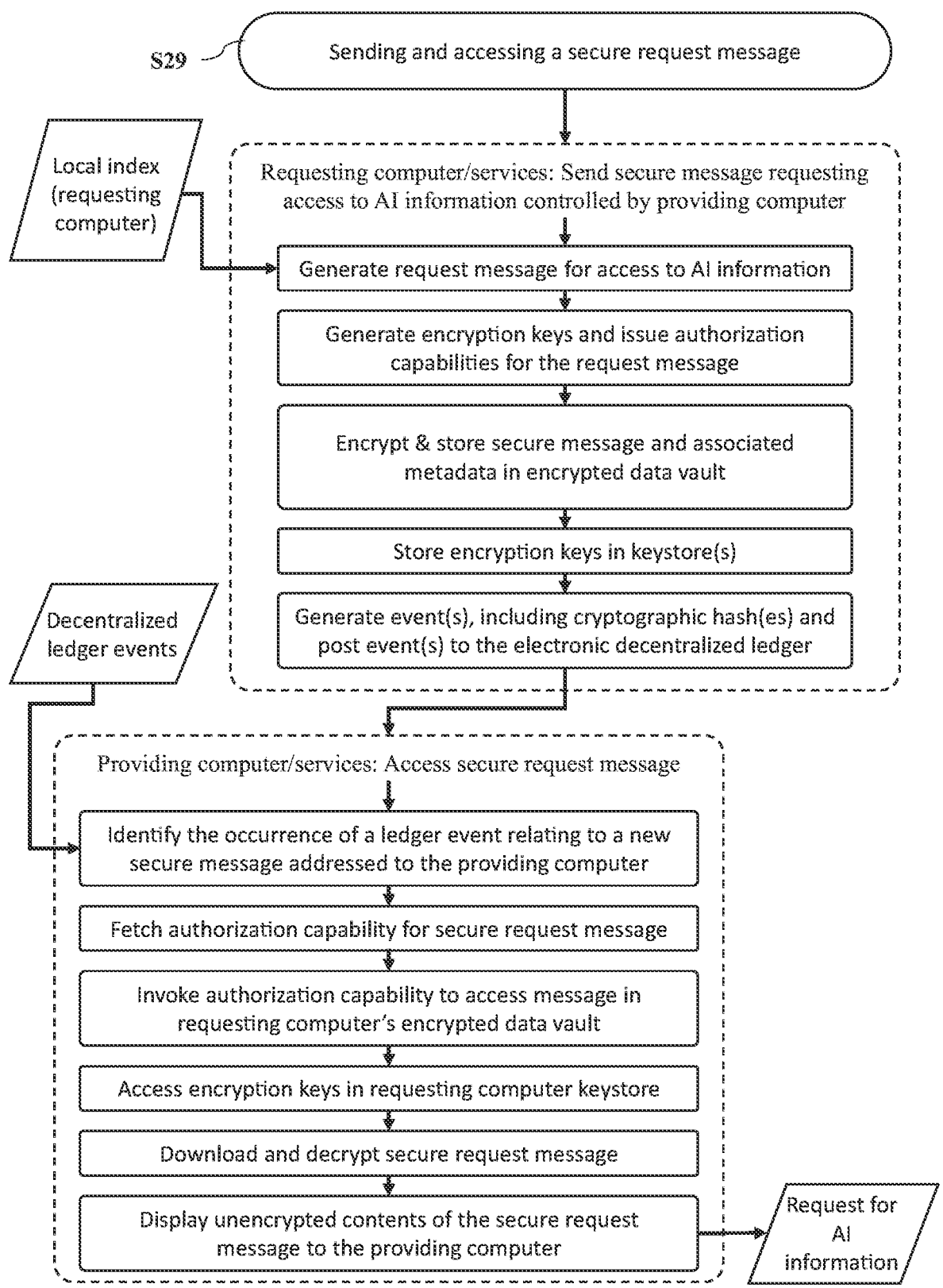
FIG. 13 is a flowchart diagram illustrating example detailed operations for implementing step S29 in FIG. 12 relating to a requesting computer sending and a providing computer accessing a secure request message.

FIG. 13 illustrates an example implementation of step S29 in FIG. 12, where the requesting computer sends a secure message requesting access to AI information, and the providing computer accesses that secure request message. Using information from its local index, including indexes of the AI information requested, addressing information of the providing computer, and/or formatting instructions in the public metadata, the requesting computer generates a request message for access to the requested AI information. The providing computer generates encryption keys and issues authorization capabilities for that message, generates a cryptographic hash of the message, encrypts and stores that message in a requesting computer encrypted data vault, and stores the encryption keys in a providing computer keystore. In some other example embodiments, the requesting computer may be granted a write-access authorization capability to write the secure request message directly to a providing computer encrypted data vault. The requesting computer then initiates the posting of associated events to the decentralized ledger.

The providing computer, identifies the occurrence of a new ledger event related to a secure request message, fetches authorization capabilities for that secure request message, invokes the authorization capabilities to access the secure request message in the requesting computer encrypted data vault, accesses and unwraps the encryption keys from the requesting computer keystore, downloads and decrypts the secure message, and displays the plaintext contents of the secure request message to the user of the providing computer or to an automated evaluation service controlled by the providing computer.

Accessing AI Information & Recording Access Events

Figure 14:
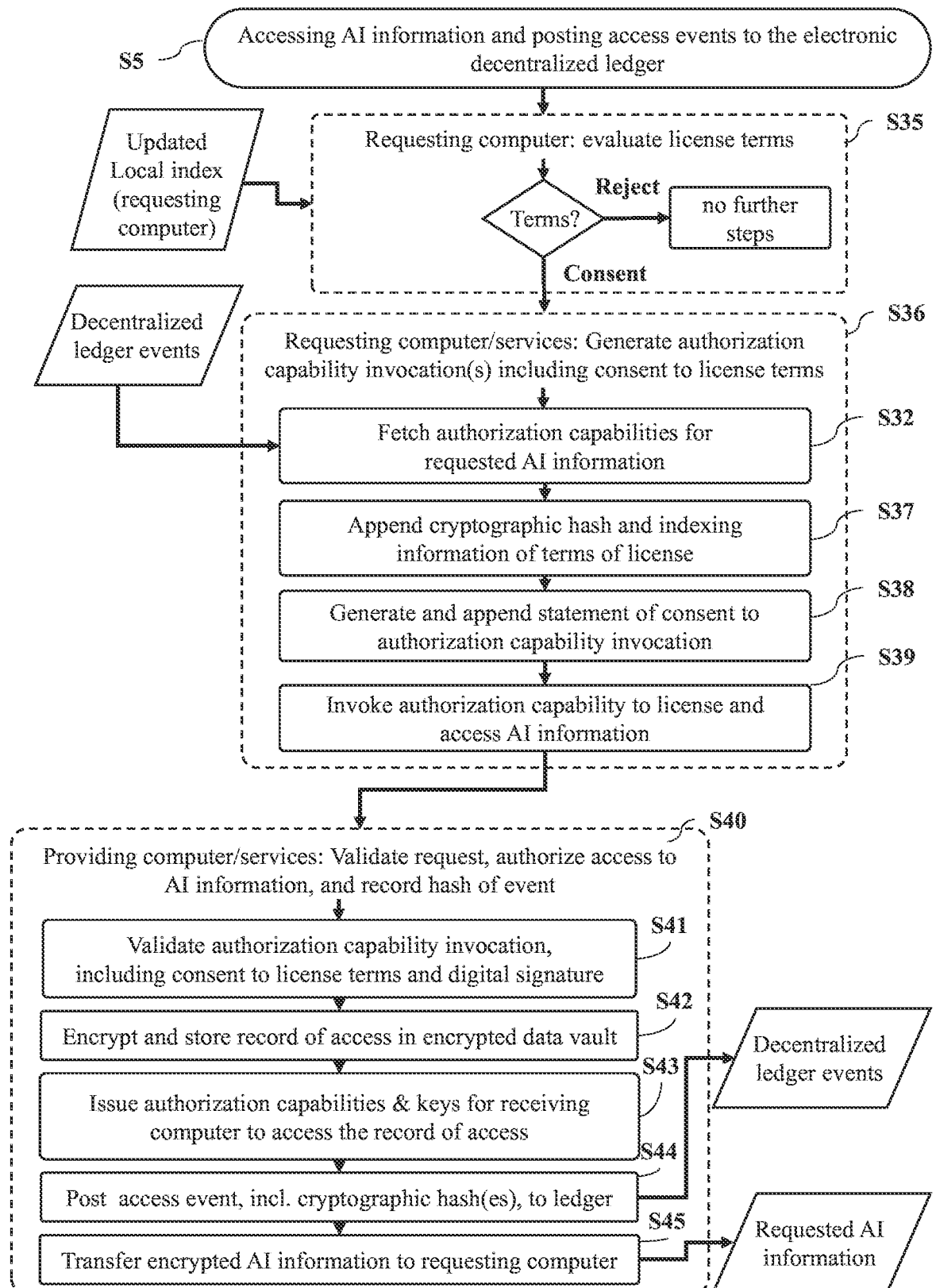
FIG. 14 is a flowchart diagram illustrating example detailed operations for implementing step S5 in FIG. 4.

Continuing the example in FIG. 4, the requesting computer licenses and invokes access to AI information in the providing computer encrypted data vault, which then generates an auditable record of the access event in step S5. An example implementation of step S5 is illustrated in FIG. 14.

The requesting computer reviews the license terms associated with the requested AI information in step S35. If those terms are rejected, then the requesting computer may take no further action, or may alternately issue one or more secure messages with a counteroffer to the providing computer. If consenting to those terms, then the requesting computer generates an authorization capability invocation which includes a digitally-signed consent response to the license terms in step S36. This consent/invocation may be performed by the requesting computer via the following sub-steps: fetching authorization capabilities (from the decentralized ledger or other means) for the requested AI information set(s) in step S32, appending cryptographic hash(es) of the license terms and indexing information associated with the license terms in step S37, generating and appending an explicit statement of consent to the license terms in step S38, and invoking the authorization capability by digitally signing with the private cryptographic key corresponding to the public key to which the authorization capability was addressed and presenting the signed invocation to the providing computer encrypted data vault in step S39.

The providing computer encrypted data vault(s) and leger agent then validate the request, authorize access to the requested AI information, and record auditable evidence of the consent and access events in step S40, through the following sub-steps: validating the authorization capability invocation, including the consent to license terms and requesting computer digital signature in step S41, generating, encrypting, and storing a detailed record of access, including the signed invocation, in an encrypted data vault in step S42, issuing authorization capabilities and encryption keys for the requesting computer to access the record of access in step S43, initiating the posting of an access event, including cryptographic hash(es) of the access record to the decentralized ledger in step S44, and finally transferring the requested AI information in encrypted form to the requesting computer in step S45. In an example embodiment, this process is done automatically by services controlled by the providing computer.

By requiring that the requesting computer incorporate a consent response in the digitally-signed authorization capability invocation, the providing computer ensures that it receives explicit consent to the license terms prior to transferring the requested AI information. By automatically generating a record of access to include the signed invocation, and then posting a cryptographic hash of that record to the decentralized ledger, the providing computer establishes immutable, auditable evidence of that consent. By making the detailed access record available to the requesting computer via, the providing computer gives the requesting computer a means to reference the AI information set(s) as ancestors of any future updates or outputs generated from the access event.

In an example embodiment, the providing computer may also revoke access to AI information by revoking an authorization capability it has previously issued. Revocation may be achieved by the providing computer changing the change the status of one or more authorization capabilities stored by the providing computer encrypting data vault, effectively instructing the encrypted data vault to no longer honor invocations of those revoked capabilities. In some example embodiments, the providing computer may initiate posting of event(s) to the decentralized ledger or communication of secure messages to inform the holder(s) of the revoked authorization capabilities that their access has been revoked. Because the AI information remains hosted on the providing computer encrypted data vault until explicitly licensed and accessed by the requesting computer, revocation of authorization capabilities is an effective mechanism to withdraw access to AI information.

A providing computer may incorporate into the license terms instructions to which the requesting computer must consent for how to handle requested AI information in the event that an authorization capability has been revoked after the requesting computer has already accessed the AI information. Requesting computer client-controlled services may be configured to automatically execute those instructions, notify the requesting computer of the revocation, and/or present evidence of having followed such instructions to the providing computer.

Operating on/with AI Information

Figure 15:
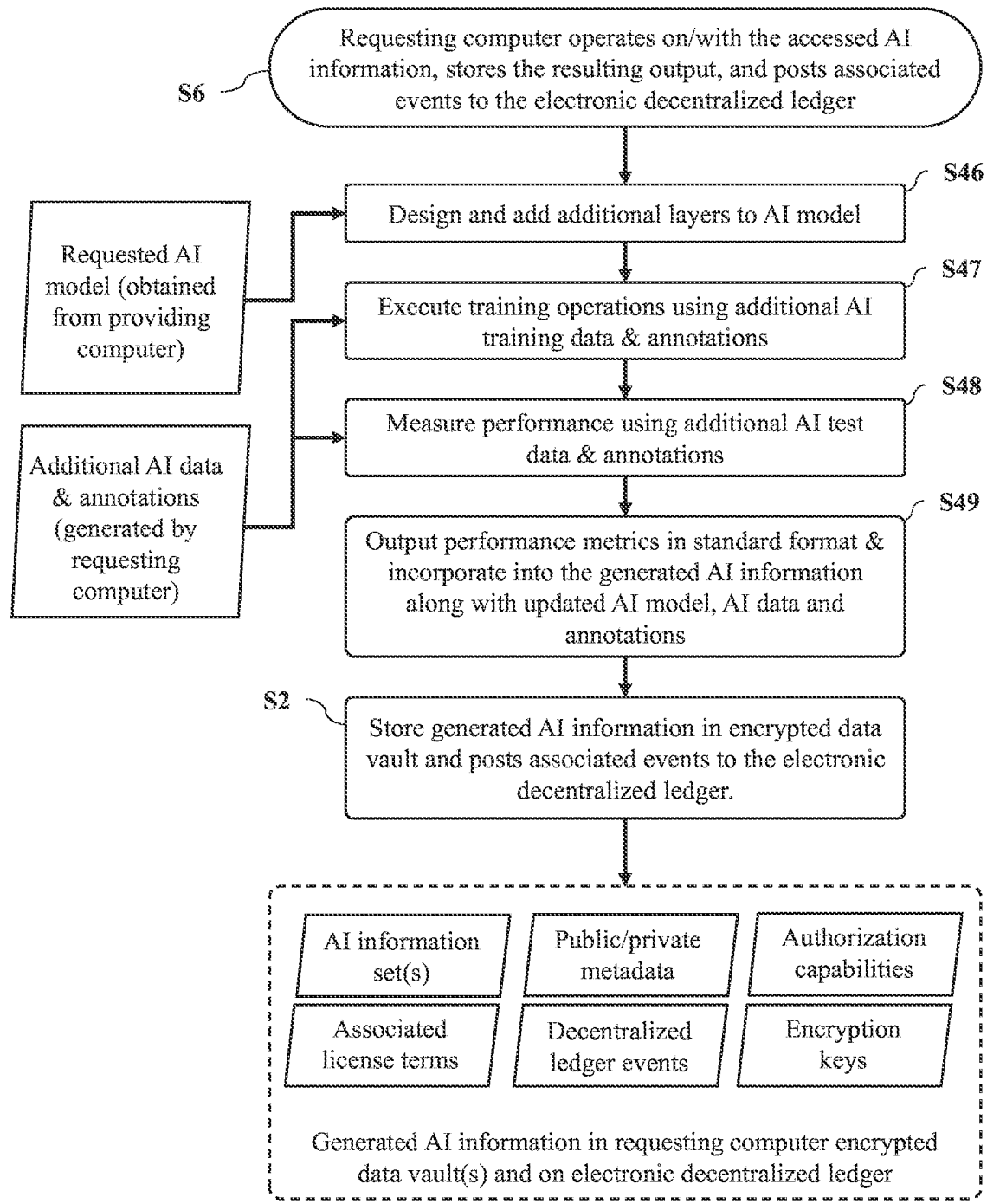
FIG. 15 is a flowchart diagram illustrating example detailed operations for implementing step S6 in FIG. 4 relating to a requested computer operating on/with AI information accessed from a providing computer.

Continuing the example in FIG. 4, the requesting computer operates on or with the AI information accessed, generating additional and/or updated AI information sets and making that AI information available via the encrypted data vault and decentralized database methods in step S6. An example implementation of step S6 is illustrated in FIG. 15, the steps of which are performed by the requesting computer and/or its client-controlled services.

After obtaining from the providing computer encrypted data vault the requested AI model and possibly other AI information, additional computational layers are designed and added to the AI model in step S46. These layers may be simpler data processing algorithms or heuristics (e.g., conversion of an image from RGB space to HSV representation prior to input into a neural network), and/or they may be more advanced (e.g., additional layers of a computational neural network). In an example where the providing computer has split the AI model into atomic computational layers and stored as individual AI information set(s), the requesting computer may also re-order computational layers, insert additional layers in-between, or modify the topology of the requested AI model.

Additional AI data and annotations are generated by the requesting computer and/or obtained via license and authorization capability invocation from other encrypted data vaults. This additional AI data is used to train, using machine learning algorithms, the requested/modified AI model to generate a new output and/or to enhance the AI model's performance in step S47. A subset of the additional AI data is also used as a test set to measure the performance of the AI model after modification and/or training in step S48. Output performance metrics are generated in a standard format specified by the selected context(s) (e.g., JSON files specifying precision, recall, counts of outcomes, execution times, etc.), and incorporated along with the updated AI model and additional AI data and annotations into generated AI information set(s) in step S49. The requesting computer then stores the generated AI information set(s) in one or more encrypted data vault(s) and initiates the posting of associated events to the decentralized ledger in step S2 as in FIG. 4. In other example embodiments, the requesting computer may have obtained a write-access authorization capability from the providing computer and may store the generated AI information as an update to the existing AI information in the providing computer encrypted data vaults.

In another example, the requesting computer may operate the requested AI model on one or more sets of requested and/or generated additional AI data to generate insights based on that data. For example, the requesting computer may obtain access to a data analytics model and then operate that model on a combination of input data provided by the requesting computer and data requested and obtained from other encrypted data vaults. The output of the model may identify a pattern in the data or provide the requesting computer with certain insights related to that data. According to the license terms and consent arrangement for the requested AI model and data, the requesting computer may now have certain rights to utilize the resulting output insights for downstream purposes, such as identifying business prospects or targeting a particular group of subjects for a follow-up healthcare study.

In some example embodiments, computing operations performed on/with AI models and data may occur as part of a client-controlled data processing service. The requesting computer may further create a decentralized identifier for that data processing service and initiate posting to the decentralized ledger of public cryptographic keys, identifying information, and cryptographically verifiable credentials asserting that the data processing service is under the control of the providing computer; the providing computer may then delegate authorization capabilities to that service utilizing a chain of digital signatures that may then be validated by the providing computer(s) encrypted data vault(s). Using these methods, the data processing service may on behalf of the requesting computer directly access the requested AI models and/or data from the providing computer(s) encrypted data vaults, eliminating the need for a separate data transfer step from the requesting computer to another data processing device to perform the AI operation.

Executing Tests & Making Results Available in the Decentralized Database

Figure 16:
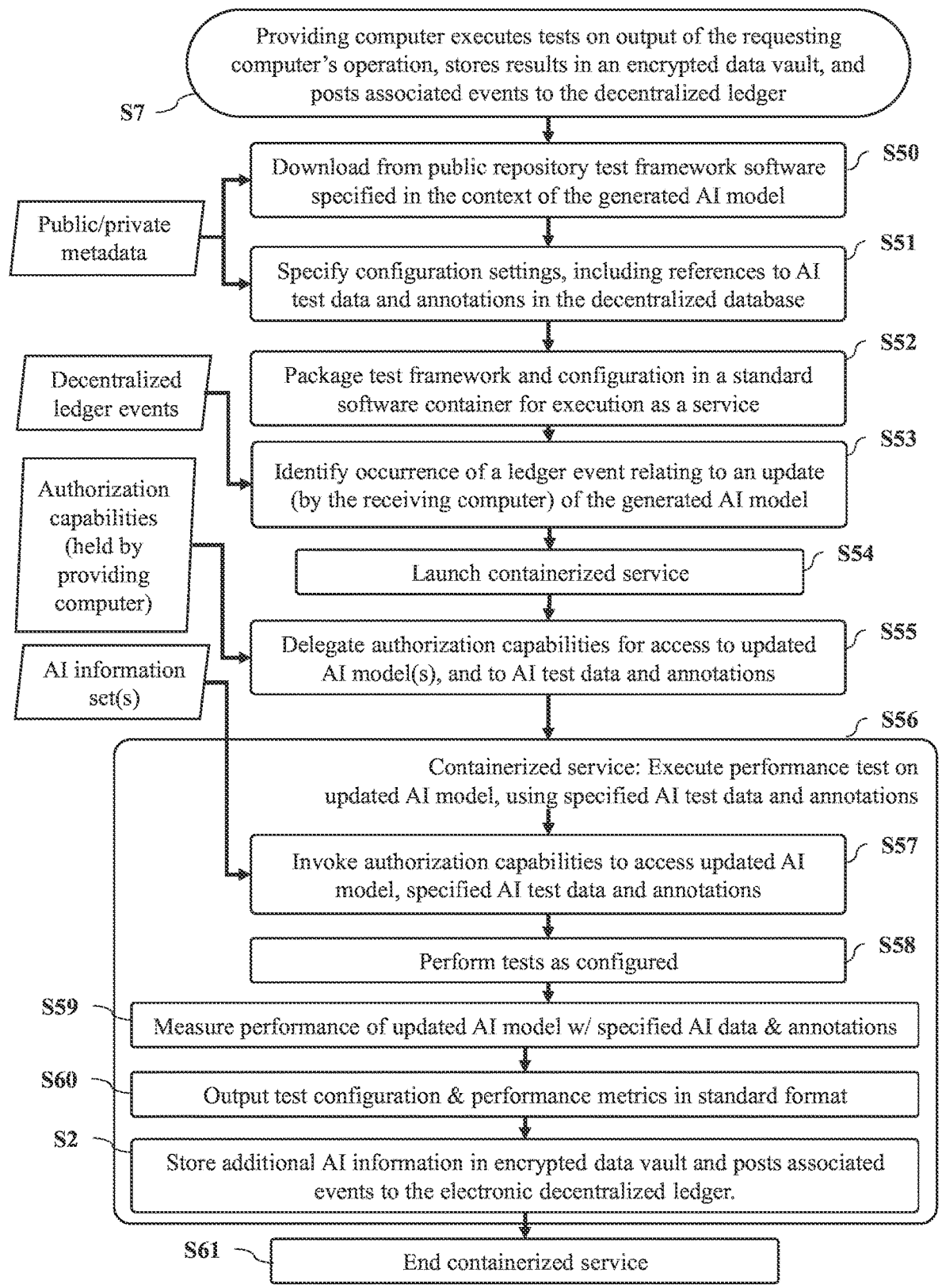
FIG. 16 is a flowchart diagram illustrating example detailed operations for implementing step S7 in FIG. 4 relating to a providing computer executing pre-configured tests on AI information updated by a requesting computer.

Continuing the example in FIG. 4, the providing computer configures a set of performance tests to run automatically when it detects that an associated AI model has been accessed, updated, and a modified version made available for use by the requesting computer in step S7. An example implementation of step S7 is illustrated in FIG. 16, the steps of which are performed by the providing computer and/or its client-controlled services.

Specifications for an AI test framework software and/or testing configuration settings are obtained from the combination of public and/or private metadata associated with the providing computer's original AI model(s), and the specified test framework software is accessed from a public repository (or in some example embodiments accessed from an encrypted data vault) and configured accordingly in step S50. Specifications for AI test data and annotations, including indexing information to locate these data sets, are further accessed from the combination of public and/or private metadata associated with the providing computer's original AI model(s) in step S51. By specifying the test framework software/configuration and one or more "golden" sets of AI test data in the metadata of the AI model(s), the providing computer effectively pre-configures a self-specified, controlled test for the AI model(s).

The test software is packaged into a software container, and a set of decentralized identifier(s), public cryptographic keys, identifying information, and/or verifiable credentials assertion(s) are generated, and associated events are posted to the decentralized ledger in step S52. At this point, the software container may be stored as a container image, ready to be launched by the provider computer or by automated services controlled by the provider computer.

Upon observing on the decentralized ledger an event corresponding to a requesting computer having generated AI model(s) as an update or modification to the providing computer's original AI model(s) in step S53, the pre-configured test framework is launched as a containerized software service in step S54, at which point the providing computer delegates obtains and delegates authorization capabilities to the containerized service to access the updated AI model(s) in the requesting computer encrypted data vault and any other AI test data and/or models specified in the test configuration in step S55.

The containerized service then executes a performance test on the updated AI model in step S56 via the following sub-steps: invoking the authorization capabilities to access the updated AI model and specified AI test data and annotations in step S57, performing the tests as configured in step S58, measuring the performance of the updated AI model according to the specified tests in step S59, outputting the test parameters and performance metrics in the format defined in the test configuration in step S60, storing the results as additional AI information, linked to the updated AI model in a providing computer encrypted data vault, and initiating the posting of associated events to the decentralized ledger in step S2 as in FIG. 4. The containerized service may then be exited or deactivated, leaving a container image available to be re-launched for future testing in step S61.

In some applications, updates or transfer learning operations applied to an AI model may add new capabilities (e.g., re-training an image classification model to identify a new class of objects), or they may enhance existing capabilities (e.g., improving the performance of the image classification model for low-light conditions). In these applications, the requesting computer performing the update may test and optimize the performance of the updated AI model for those new capabilities or conditions, but the requesting computer may not be able to fully test the AI model in all of its original use cases. A problem in AI development is that transfer learning or modification of an AI model may degrade the performance of the model for certain operations for which it was originally trained. In the example above, the providing computer ensures that the performance of future updates to the AI model are tested for performance in original use cases under known test conditions, and the results of those tests are reported and made available in a self-specified, consistent format.

In other example embodiments, similar testing may be performed by the requesting computer or by one or multiple third-party computers. In some other example embodiments, such testing may be performed manually (rather than triggered automatically by ledger events).

In some other example embodiments, similar automated testing or evaluation may be performed on AI data and/or annotations (rather than on AI models) to ensure that updates to the AI data and/or annotations do not degrade the performance of the AI data and/or annotations when used for a specific test case (e.g., confirming that the updates or additions to an annotation set do not invalidate the output of a training operation using that data set).

Figure 17:
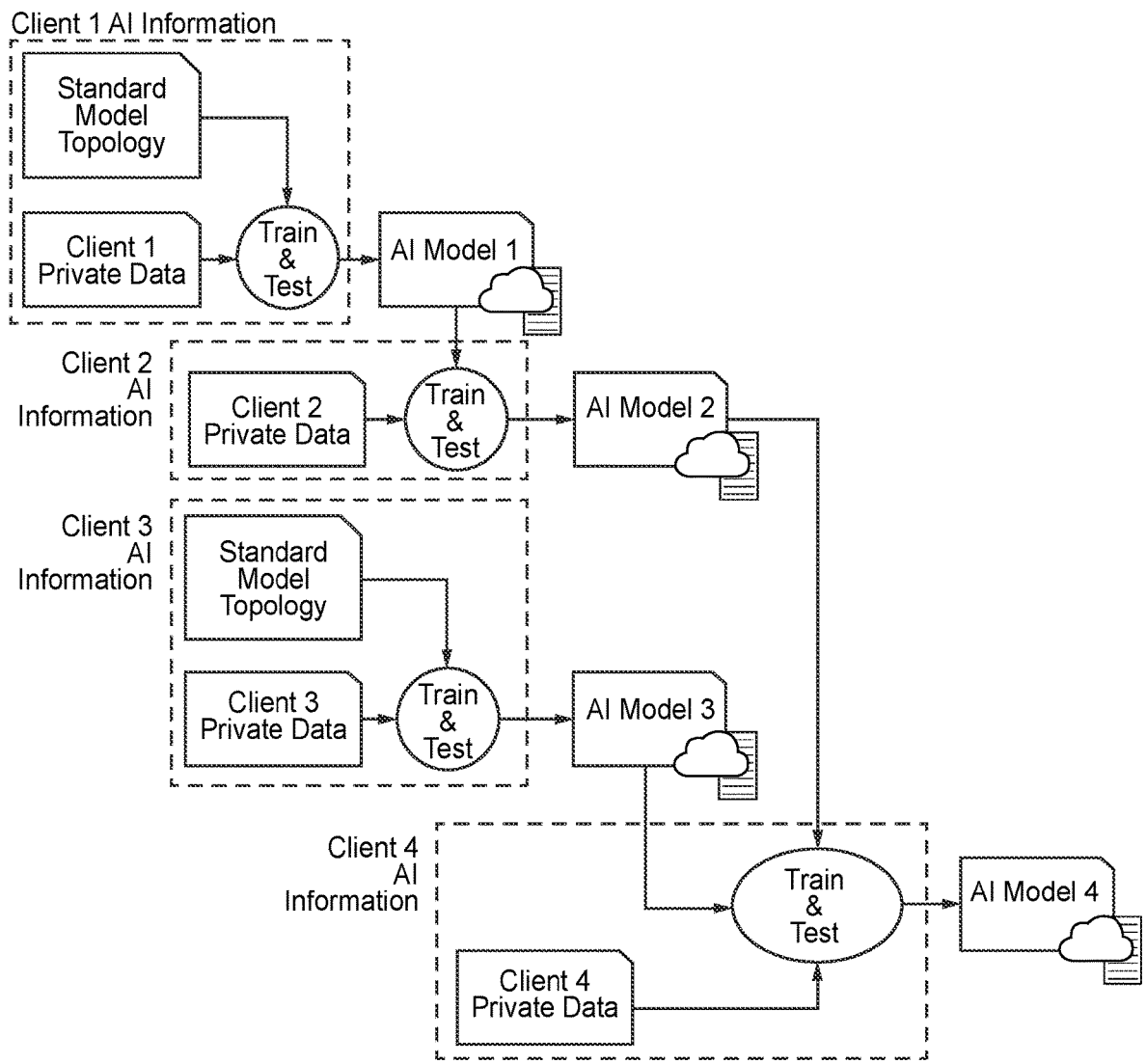
FIG. 17 illustrates example output resulting from multiple repeated AI information update and transfer learning operations among client computers using the decentralized database.

FIG. 17 illustrates example data output resulting from steps S6 and S7, performed repeatedly by multiple providing and requesting client computers utilizing the decentralized database. AI models may be generated, stored in encrypted data vaults, made available, accessed and linked together via linked data metadata to form a collaborative learning model. In this example, Client Computer 1 accessed a publicly-available model and trained it on a set of private AI data and annotations. The resulting AI Model 1 is made available in the decentralized database, as is the AI data set, labeled Client 1 Private Data. Client Computer 2 accesses AI Model 1 and conducts a training operation using a different set of private data. The resulting AI Model 2 is also made available in the decentralized database. Client Computer 3 accesses the standard public AI model, and then performs another transfer training operation using its own private data. Finally, Client Computer 4 access both AI Models 2 and 3, synthesizes layers from those models, and performs another training operation using its own private AI data and annotations. The resulting AI model 4 is also made available in the decentralized database.

In this example, each client computer may define license terms for AI models or data generated, and those license terms may follow the AI information and cascade through updates by other client computers. Following this example, the license terms for AI Model 4 may include a cascading license relationship from ancestor AI Models 1, 2, and 3 and/or from Clients 1, 2, and 3 Private Data. In this example, client-controlled services may, prior to each access of AI information, automatically validate license terms for their ability to cascade and automatically incorporate and generate the cascaded license terms in the updated AI information.

In some example embodiments, the method in step S7 may be executed as a containerized software service, in which multiple client computers each provide AI information for operation of an AI model or test suite and in which none of the third-party computers retain access to the others' information as a result of the operation. Each client computer may delegate their corresponding authorization capabilities to the containerized software service, and in some embodiments these authorization capabilities may be delegated with finite time limits, IP address restrictions, one-time access, or other additional security measures. The result of such a multi-party delegation of authorization capabilities is a software service which may access multiple AI information sets in different encrypted data vaults in which the individual providing computers have not granted access to each other.

Technical Advantages and Benefits

The technology described above has the unique advantage of enabling decentralized control of AI information throughout the collaborative AI workflow including: the storage of the information, permission management and access control, linking together a searchable decentralized database, and licensing and tracing the history of consent, access, and update events. The technology forms a decentralized trust management and control layer that integrates with and enables methods of collaborative AI development and operation without adding additional complexity or interfering with those AI methods themselves.

There are many applications for the technology described above. One example application involves the licensing and operation of AI models on data held privately in one or more encrypted data vault(s), in which the AI model(s) may have been trained on one or many AI data sets in the decentralized database. An individual entity or corporate entity may license and operate such an AI model to analyze private notes, contacts, and/or correspondence, which may be synthesized with information in other encrypted data vaults and/or public information, to generate outputs relating to business opportunities, idea discovery, personal reminders, gift ideas, etc. In this example application, the decentralized database provides an efficient and convenient platform to find, license, and access the AI model(s), and an efficient and convenient method to securely and privately operate those AI model(s) on the entity's information. Individual and corporate entities may be more likely to utilize AI techniques given the access control and monitoring capabilities provided by the encrypted data vault and associated technologies described above.

At larger scale, the decentralized database may be applied broadly to empower millions of companies and individuals to better control and realize benefits from the exchange of their personal information. Currently, social media, search providers, smartphone app providers, and other companies mine public data, use it to train AI models, and output AI insights. These companies sell this information, but currently they are not required to license the AI information from individuals and companies that provide the information.

In a system with decentralized access control, users' online behavior, purchasing behavior, social network behavior, health information, and other valuable information is individually encrypted and controlled by the users themselves. The technology described above permits users to manage and maintain privacy and security and to exchange this information selectively and control/manage the information throughout its use, for license and reimbursement by the data consumers or aggregators. These technologies may also allow data aggregators and AI developers to execute these transactions automatically and at large scale, facilitating their business of providing AI-driven insights to customers.

Another example application is healthcare data aggregation and analytics, where users may utilize the decentralized database to securely store and share electronic health records with providers, insurance companies, home healthcare agencies, personal assistants, family members, etc. The ease of access and secure access control provided by the described technology allows sharing of data across traditional trust boundaries (e.g., different healthcare networks/providers), and the decentralized nature of the technology permits patients to control and access their health information. Furthermore, users may selectively share and license their healthcare information to data aggregators and researchers for training and/or operation of AI models. The ability to track and control downstream access, use, and licensing of the information allows users to obtain compensation for their information, even if it is re-shared or incorporated into multiple different data sets, research studies, etc. Because the information is accessed directly from encrypted data vaults under the user's control, the user may restrict or revoke access to data aggregators and/or consumers if they do not want their data to be used for a particular purpose or by particular organizations, or if they want to generally withdraw their data from use.

Decentralized collaborative learning is another example application described above. The use of the decentralized database for collaborative learning may result in an AI model being trained on multiple AI information sets independently, such that the operators of the AI model may benefit from its prior access to those training information sets, and without the operators of the AI model ever having access to some or all of those training information sets. As described above, trust in the AI model may be established through an auditable history on the decentralized ledger of update events and cryptographic hashes, backed by more detailed records in encrypted data vaults which may be access and audited upon request to the controlling computer. These capabilities allow organizations or groups that wish to compartmentalize sensitive information to build through transfer learning and utilize powerful AI models without having to aggregate their sensitive information or cross trust boundaries by sharing sensitive information with competitors.

Furthermore, participating organizations may use the described access control mechanisms to manage and control the boundaries within which AI models may operate. For example, a government organization or company may issue authorization capabilities in such a way to allow limited access to certain AI information sets by certain classes of AI models or by AI models with a certain known ancestry to be operated under the control of certain individuals or organizations, and/or stored in encrypted data vaults on certain server computers. The ability to granularly define access permissions and incorporate them into authorization capabilities which may be delegated, along with the automated recording of access events and the linking of those events to the output of the AI operation(s), results in a system of access control that is secure, traceable, flexible, and readily managed and operated.

Description of an Example Computing System

Figure 18:
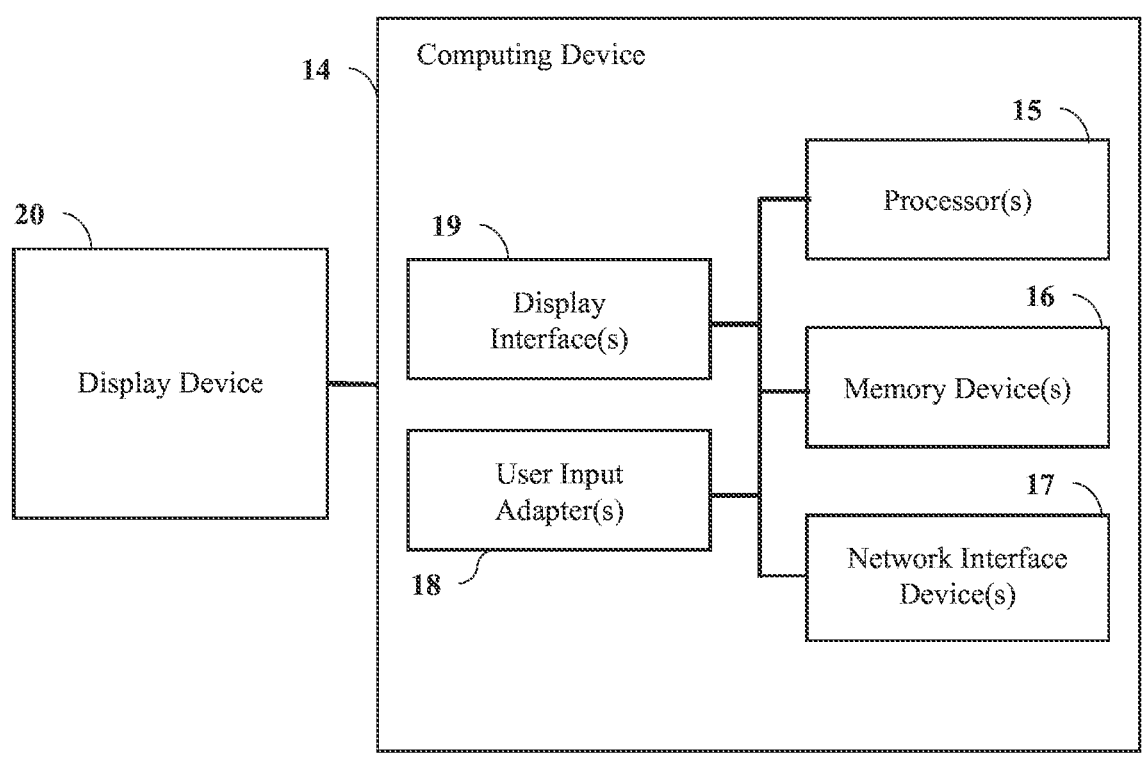
FIG. 18 shows an example computing system that may be used in some embodiments to implement features described herein.

FIG. 18 shows an example computing system that may be used in some embodiments to implement computers (e.g., server computers, client computers, mobile computing devices, etc.), services, nodes, interfaces, and features described above. An example computing device 14 (which may also be referred to, for example, as a "computing device," "computer system," or "computing system") includes one or more of the following: one or more hardware processors 15; one or more memory devices 16; one or more network interface devices 17; one or more display interfaces 19; and one or more user input adapters 18. Additionally, in some embodiments, the computing device 14 is connected to or includes a display device 20. As will explained below, these elements (e.g., the hardware processors 15, memory devices 16, network interface devices 17, display interfaces 19, user input adapters 18, display device 20) are hardware devices (for example, electronic circuits or combinations of circuits) that are configured to perform various different functions for the computing device 14.

In some embodiments, each or any of the hardware processors 15 is or includes, for example, a single- or multi-core hardware processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 15 uses an instruction set architecture such as x86 or Advanced RISC Machine (ARM).

In some embodiments, each or any of the memory devices 16 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 15). Memory devices 16 are examples of non-volatile computer-readable storage media.

In some embodiments, each or any of the network interface devices 17 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 19 is or includes one or more circuits that receive data from the hardware processors 15, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 20, which displays the image data. Alternatively or additionally, in some embodiments, each or any of the display interfaces 19 is or includes, for example, a video card, video adapter, or graphics processing unit (GPU).

In some embodiments, each or any of the user input adapters 18 is or includes one or more circuits that receive and process user input data from one or more user input devices (not shown in FIG. 18) that are included in, attached to, or otherwise in communication with the computing device 14, and that output data based on the received input data to the hardware processors 15. Alternatively or additionally, in some embodiments each or any of the user input adapters 18 is or includes, for example, a PS/2 interface, a USB interface, a touchscreen controller, or the like; and/or the user input adapters 18 facilitates input from user input devices (not shown in FIG. 18) such as, for example, a keyboard, mouse, trackpad, touchscreen, etc.

In some embodiments, the display device 20 may be a Liquid Crystal Display (LCD) display, Light Emitting Diode (LED) display, or other type of display device. In embodiments where the display device 20 is a component of the computing device 14 (e.g., the computing device and the display device are included in a unified housing), the display device 20 may be a touchscreen display or non-touchscreen display. In embodiments where the display device 20 is connected to the computing device 14 (e.g., is external to the computing device 14 and communicates with the computing device 14 via a wire and/or via wireless communication technology), the display device 20 is, for example, an external monitor, projector, television, display screen, etc.

In various embodiments, the computing device 14 includes one, or two, or three, four, or more of each or any of the above-mentioned elements (e.g., the hardware processors 15, memory devices 16, network interface devices 17, display interfaces 19, and user input adapters 18). Alternatively or additionally, in some embodiments, the computing device 14 includes one or more of: a processing system that includes the hardware processors 15; a memory or storage system that includes the memory devices 16; and a network interface system that includes the network interface devices 17.

The computing device 14 may be arranged, in various embodiments, in many different ways. As just one example, the computing device 14 may be arranged such that the hardware processors 15 include: a multi (or single)-core hardware processor; a first network interface device (which implements, for example, WiFi, Bluetooth, NFC, etc.); a second network interface device that implements one or more cellular communication technologies (e.g., 3G, 4G LTE, CDMA, etc.); memory or storage devices (e.g., RAM, flash memory, or a hard disk). The hardware processor, the first network interface device, the second network interface device, and the memory devices may be integrated as part of the same SOC (e.g., one integrated circuit chip). As another example, the computing device 14 may be arranged such that: the hardware processors 15 include two, three, four, five, or more multi-core hardware processors; the network interface devices 17 include a first network interface device that implements Ethernet and a second network interface device that implements WiFi and/or Bluetooth; and the memory devices 16 include a RAM and a flash memory or hard disk.

As previously noted, whenever a software module or software process performs an action, operation, or function, the action, operation, or function described above, in actuality it is performed by underlying hardware elements according to the instructions that comprise the software module. Consistent with the foregoing, in various embodiments, for each or any combination of the components of the decentralized database system, the memory devices 16 could load program instructions for the functionality of those components, are implemented using an example of the computing device 14 of FIG. 18. In such embodiments, the following applies for each component: (a) the elements of the 14 computing device 14 shown in FIG. 18 (i.e., the one or more hardware processors 15, one or more memory devices 16, one or more network interface devices 17, one or more display interfaces 19, and one or more user input adapters 18), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 16 (e.g., in various embodiments, in a volatile memory device such as a RAM or an instruction register and/or in a non-volatile memory device such as a flash memory or hard disk) and all actions described herein as performed by the software modules are performed by the processors 15 in conjunction with, as appropriate, the other elements in and/or connected to the computing device 14 (i.e., the network interface devices 17, display interfaces 19, user input adapters 18, and/or display device 20); (c) alternatively or additionally, to the extent it is described herein that the component processes and/or otherwise handles data, in some embodiments, such data is stored in the memory devices 16 (e.g., in some embodiments, in a volatile memory device such as a RAM and/or in a non-volatile memory device such as a flash memory or hard disk) and/or is processed/handled by the processors 15 in conjunction, as appropriate, the other elements in and/or connected to the computing device 14 (i.e., the network interface devices 17, display interfaces 19, user input adapters 18, and/or display device 20); (d) alternatively or additionally, in some embodiments, the memory devices 15 store instructions that, when executed by the processors 15, cause the processors 15 to perform, in conjunction with, as appropriate, the other elements in and/or connected to the computing device 14 (i.e., the memory devices 16, network interface devices 17, display interfaces 19, user input adapters 18, and/or display device 20), each or any combination of actions described herein as performed by the component and/or by any software modules described herein as included within the component.

The hardware configurations shown in FIG. 18 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 18, (e) via other hardware arrangements, architectures, and configurations, and/or via combinations of the technology described in (a) through (e).

Selected Terminology

Whenever it is described in this document that a given item is present in "some embodiments," "various embodiments," "certain embodiments," "certain example embodiments, "example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of the Described Subject Matter

Although process steps, algorithms or the like, including without limitation with reference to FIGS. 1-18, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A method of controlling access among providing client computers and requesting client computers independent of one another, using services under decentralized control of the independent providing client computers and the independent requesting client computers, to at least one set of artificial intelligence (AI) information, comprising:
configuring, by a providing client computer of the independent providing client computers, an encrypted data vault and a cryptographic keystore, wherein the encrypted data vault and the cryptographic keystore are part of the services under decentralized control of the providing client computer, having an interface to receive, evaluate, and respond to a request made by a requesting client computer of the independent requesting client computers;
generating, by the providing client computer, a set of AI information of the at least one set of AI information including: (i) one or more AI models, (ii) data and/or annotations used to test, train, or operate the one or more AI models, and/or (iii) output data generated from the one or more AI models;
encrypting, by the providing client computer, the generated set of AI information using keys obtained from the cryptographic keystore;
storing, by the providing client computer, the encrypted set of AI information in the encrypted data vault, such that the encrypted set of AI information has a unique identifier and is accessible via a unique portion of the interface of the encrypted data vault;
issuing, by the providing client computer, to the requesting client computer, a digitally signed assertion communicating authorization for the requesting client computer to access the encrypted set of AI information at its unique portion of the interface of the encrypted data vault;
wherein one or more of the services under decentralized control of the providing client computer are configured to receive from the requesting client computer an authorization capability invocation including the digitally signed assertion communicating authorization for the requesting client computer to access the encrypted set of AI information;
wherein the authorization capability invocation is generated and signed by the requesting client computer;
wherein one or more of the services under decentralized control of the providing client computer are configured to validate that (i) the authorization capability invocation was signed using cryptographic information specified in the digitally signed assertion communicating authorization included in the authorization capability invocation, and (ii) the digitally signed assertion communicating authorization included in the authorization capability invocation was issued by the providing client computer;
wherein the encrypted data vault is configured to provide access to the encrypted set of AI information to the requesting client computer upon validation of the authorization capability invocation;
wherein the cryptographic keystore is configured to provide access to the keys to the requesting client computer upon validation of the authorization capability invocation; and
wherein the encrypted set of AI information is useable by the requesting client computer to facilitate machine learning, model operation, and/or data aggregation.

2. The method in claim 1, wherein:
the digitally signed assertion communicating authorization for the requesting client computer to access the encrypted set of AI information is delegated by the requesting client computer to an additional recipient requesting client computer of the independent providing client computers and the independent requesting client computers, wherein:
the delegated digitally signed assertion contains a former digitally signed assertion communicating authorization to access, along with additional information specifying: (i) a public cryptographic key corresponding to the additional recipient client computer, and (ii) a digital signature of the requesting client computer performing the delegation;
the digitally signed delegated assertion comprises a chain of digitally signed assertions originating from an assertion digitally signed by the providing client computer; and
the delegated digitally signed assertion, comprising the chain of digitally signed assertions originating from an assertion digitally signed by the providing computer, permits the encrypted data vault to validate a request for access, by the additional recipient requesting client computer, to the encrypted set of AI information.

3. The method in claim 1, wherein:
the providing client computer initiates posting of an event related to creation, modification, deletion, authorization to access, or access to the set of AI information stored in the encrypted data vault to an electronic decentralized ledger coupled to one or more blockchain nodes operating communication and consensus protocol on the event,
the event in the electronic decentralized ledger includes a set of indexing information relating the event to the set of AI information stored in the encrypted data vault,
the set of indexing information includes a unique identifier of the set of AI information, a cryptographic hash of contents of the generated AI information, and/or an address for access to the set of AI information in the encrypted data vault,
multiple sets of indexing information form a searchable master index of AI information across the services under decentralized control of the independent providing client computers and the independent requesting client computers.

4. The method in claim 1, wherein:
the set of AI information stored in the encrypted data vault includes descriptive metadata relating to the generated AI information,
the descriptive metadata includes public and/or private metadata components with encrypted private metadata components that are access-controlled by the providing client computer, and
contents of the public and private metadata components are searchable with authorization to access.

5. The method in claim 4, wherein:
the set of AI information stored in the encrypted data vault includes a set of descriptive metadata representing linked-data relationships between the set of AI information and other sets of AI information stored in the services under decentralized control of the independent providing client computers and the independent requesting client computers, the set of descriptive metadata further includes linked-data relationships specifying one or more ancestors of the set of AI information, the set of descriptive metadata further includes at least one cryptographic hash of the one or more ancestors of the set of AI information, and contents of the set of descriptive metadata are searchable after authorization to access is granted.

6. The method in claim 4, further comprising the providing client computer:

parsing and splitting the generated set of AI information into more than one atomic sets of AI information, formatting each of the more than one atomic sets of AI information to include a set of descriptive metadata associated with each of the more than one atomic sets of AI information, each set of descriptive metadata containing linked data relationships between the associated atomic set of AI information and multiple other atomic sets of AI information of the more than one atomic sets of AI information, and storing in the encrypted data vault controlled by the providing client computer the more than one formatted atomic sets of AI information including descriptive metadata to permit extraction, cross-referencing, or merging with other AI information by any client computer of the independent providing client computers and the independent requesting client computers.

7. The method in claim 3, further comprising the providing client computer:

defining license terms for access and/or use of the set of AI information stored in the encrypted data vault, creating in the set of AI information, metadata linked-data relationships to the license terms and at least one cryptographic hash of the license terms, and posting by a service controlled by the providing client computer an event related to the defining of the license terms to the electronic decentralized ledger.

8. The method in claim 3, wherein the encrypted data vault controlled by the providing client computer automatically records a record of an authorization and/or access events, and wherein indexing information and/or a cryptographic hash for the authorization and/or access events is posted by a service controlled by the providing client computer to the electronic decentralized ledger to provide an auditable history of the authorization and/or access events for the set of AI information stored in the encrypted data vault.

9. The method in claim 3, wherein:

the providing client computer configures a set of one or more pre-defined tests to act upon the set of AI information stored in the encrypted data vault, execution of the set of one or more pre-defined tests is triggered by observance by a service controlled by the providing client computer of an event on the electronic decentralized ledger related to the operation or modification of the set of AI information by any client computer of the independent providing client computers and the independent requesting client computers, the set of one or more pre-defined tests use one or more access-controlled data sets in the services under decentralized control of the independent providing client computers and the independent requesting client computers, for which the providing client computer possesses authorization capabilities, the providing client computer stores output of the set of one or more pre-defined tests in the encrypted data vault, and events associated with the output of the set of one or more pre-defined tests is posted by the service controlled by the providing client computer to the electronic decentralized ledger.

10. A method of requesting access among providing and requesting client computers independent of one another, using services under decentralized control of the independent providing client computers and the independent requesting client computers, to at least one set of artificial intelligence (AI) information controlled by a providing client computer of the independent providing client computers, comprising:

discovering, by a requesting client computer of the independent requesting client computers, an encrypted set of AI information of the at least one set of AI information controlled by the providing client computer, the encrypted set of AI information including: (i) one or more AI models, (ii) data and/or annotations used to test, train, or operate the one or more AI models, and/or (iii) output data generated from the one or more AI models, wherein the encrypted set of AI information is stored in an encrypted data vault, of the services under decentralized control of the providing client computer, having an interface to directly receive, evaluate, and respond to a request for access;

receiving, by the requesting client computer, a digitally signed assertion communicating authorization to access the encrypted set of AI information issued by the providing client computer;

generating, by the requesting client computer, an authorization capability invocation which includes required information specified by the encrypted data vault;

digitally signing, by the requesting client computer, the authorization capability invocation using cryptographic information specified in the digitally signed assertion communicating authorization to access the encrypted set of AI information;

presenting, by the requesting client computer, the digitally signed authorization capability invocation directly to a portion of the interface of the encrypted data vault configured to receive requests for access to the encrypted set of AI information;

receiving, by the requesting client computer, the encrypted set of AI information and keys for decrypting the encrypted set of AI information in response to the presentation of the digitally signed authorization capability invocation;

decrypting, by the requesting client computer, the encrypted set of AI information using the keys;

operating on or with, by the requesting client computer, the decrypted set of AI information to generate a result useable to facilitate machine learning, model operation, and/or data aggregation.

11. The method in claim 10, wherein:

the requesting client computer discovers the at least one set of AI information by monitoring at least one event posted to an electronic decentralized ledger coupled to one or more blockchain nodes operating communication and consensus protocol on the at least one event, the at least one event includes a set of indexing information relating to creation, modification, deletion, authorization to access, or access of/to the at least one set of AI information.

12. The method in claim 10, wherein:
the requesting client computer discovers the at least one set of AI information by compiling a local index of AI information for which the requesting client computer has some authorization to access,
the local index includes some public and private metadata associated with the at least one set of AI information,
the requesting client computer obtains the public and private metadata by invoking authorization capabilities to access the public and private metadata from one or more encrypted data vaults of the services under decentralized control of the independent providing client computer and the independent requesting client computer where the public and private metadata is stored, and
the requesting client computer executes search, filtering, and/or data interpretation operations using the local index.

13. The method in claim 10, further comprising the requesting client computer:
creating a message requesting access to the at least one set of AI information stored in the encrypted data vault controlled by the providing client computer,
encrypting the message requesting access and storing the encrypted message requesting access in an encrypted data vault controlled by the requesting client computer,
issuing to the providing client computer a digitally signed assertion communicating authorization to access the encrypted message in the encrypted data vault controlled by the requesting client computer, and
communicating to the providing client computer the digitally signed assertion communicating authorization to access the encrypted message.

14. The method in claim 13, wherein:
the encrypted message requesting access to the at least one set of AI information stored in the encrypted data vault controlled by the providing client computer includes indexing information of the set of AI information,
the encrypted message requesting access includes information about the requesting client computer, and
the communicating of the digitally signed assertion communicating authorization to access the encrypted message triggers a notification to the providing client computer of the request by the requesting client computer to access the at least one set of AI information.

15. The method in claim 10, further comprising the requesting client computer including a consent response in the digitally signed authorization capability invocation to the providing client computer,
wherein the consent response specifies consent of the requesting client computer to comply with some or all license terms defined by the providing client computer for access and/or use of the at least one set of AI information stored in the encrypted data vault.

16. The method in claim 11, further comprising the requesting client computer operating on or with the decrypted set of AI information obtained from the encrypted data vault controlled by the providing client computer, including: annotating, modifying, testing, enhancing, and/or producing an analytical output,
storing, by the requesting client computer, an output of the operation on or with the decrypted set of AI information in the encrypted data vault of the services under decentralized control of the providing client computers or in a second encrypted data vault of the services under decentralized control of the independent requesting client computers, and
initiating, by the requesting client computer, posting of events related to the output of the operating to the electronic decentralized ledger.

17. A non-transitory, computer-readable storage medium storing instructions which when executed by one or more hardware processors cause the one or more hardware processors to perform the method of claim 1.

18. A non-transitory, computer-readable storage medium storing instructions which when executed by one or more hardware processors cause the one or more hardware processors to perform the method of claim 10.

19. Apparatus associated with controlling access among providing client computers and requesting client computers independent of one another, using services under decentralized control of the independent providing client computers and the independent requesting client computers, to at least one set of artificial intelligence (AI) information requested by a requesting client computer of the independent requesting client computers, the apparatus comprising:
a hardware processor of a providing client computer of the independent providing client computers;
a memory to store instructions that when executed by the hardware processor cause the hardware processor to:
configure an encrypted data vault and a cryptographic keystore having an interface to receive, evaluate, and respond to a request;
generate a set of AI information of the at least one set of AI information including: (i) one or more AI models, (ii) data and/or annotations used to test, train, or operate the one or more AI models, and/or (iii) output data generated from the one or more AI models;
encrypt the generated set of AI information using keys obtained from the cryptographic keystore;
store the encrypted set of AI information in the encrypted data vault such that the encrypted set of AI information has a unique identifier and is accessible via a unique portion of the interface of the encrypted data vault;
issue a digitally signed assertion communicating authorization to access the encrypted set of AI information at its unique portion of the interface of the encrypted data vault;
receive from the requesting client computer an authorization capability invocation including the digitally signed assertion communicating authorization to access the encrypted set of AI information, wherein the authorization capability invocation is generated and digitally signed by the requesting client computer,
validate that (i) the authorization capability invocation was signed using cryptographic material specified in the digitally signed assertion communicating authorization included in the authorization capability invocation, and (ii) the digitally signed assertion communicating authorization included in the authorization capability invocation was issued by the providing client computer; and
provide access to the requesting client computer to the encrypted set of AI information stored in the encrypted data vault and the keys in the cryptographic keystore, in response to the validated invocation,
wherein the encrypted set of AI information is useable by the requesting client computer to facilitate machine learning, model operation, and/or data aggregation.

20. Apparatus associated with requesting access among providing client computers and requesting client computers independent of one another, using services under decentralized control of the independent providing client computers and the independent requesting client computers, to at least one set of artificial intelligence (AI) information controlled by a providing client computer of the independent providing client computers, the apparatus comprising:

a hardware processor of a requesting client computer of the independent requesting client computers;

a memory to store instructions that when executed by the hardware processor cause the hardware processor to:

discover an encrypted set of AI information of the at least one set of AI information controlled by the providing client computer, the encrypted set of AI information including: (i) one or more AI models, (ii) data and/or annotations used to test, train, or operate the one or more AI models, and/or (iii) output data generated from the one or more AI models, wherein the encrypted set of AI information is stored in an encrypted data vault controlled by the providing client computer having an interface to directly receive, evaluate, and respond to a request for access;

receive a digitally signed assertion communicating authorization to access the encrypted set of AI information issued by the providing client computer;

generate an authorization capability invocation which includes required information specified by the encrypted data vault;

digitally sign the authorization capability invocation using cryptographic information specified in the digitally signed assertion communicating authorization to access the encrypted set of AI information;

present the digitally signed authorization capability invocation directly to a portion of the interface of the encrypted data vault configured to receive requests for access to the encrypted set of AI information;

receive the encrypted set of AI information and keys for decrypting the encrypted set of AI information in response to the presentation of the digitally signed authorization capability invocation;

decrypt the encrypted set of AI information using the keys;

operate on or with the decrypted set of AI information to generate a result useable to facilitate machine learning, model operation, and/or data aggregation.

21. A system comprising:

a computer network;

one or more providing client computers and one or more requesting client computers independent of one another, operating within the computer network;

one or more client-controlled computer services operating within the computer network under decentralized control of the one or more independent providing client computers and independent requesting client computers configured to encrypt, store, control access to, request access to, obtain access to, and/or decrypt information;

wherein the one or more client-controlled computer services include one or more encrypted data vaults, each having an interface to directly receive, evaluate, and respond to a request made by a requesting client computer of the one or more independent requesting client computers;

wherein the one or more encrypted data vaults is configured by one or more providing client computers of the independent one or more providing client computers to store at least one set of encrypted Artificial Intelligence (AI) information including: (i) one or more AI models, (ii) data sets and/or annotations used to test, train, or operate the one or more AI models, and/or (iii) output data generated from the one or more AI models, the one or more encrypted data vaults forming a decentralized database of AI information;

wherein each of the one or more requesting client computers is configured to:

discover a set of encrypted AI information of the at least one set of encrypted AI information stored in an encrypted data vault of the one or more encrypted data vaults under decentralized control of a providing client computer of the one or more providing client computers;

receive a digitally signed assertion communicating authorization to access the encrypted set of AI information issued by the providing client computer, generate an authorization capability invocation which includes required information specified by the encrypted data vault, digitally sign the authorization capability invocation using cryptographic information specified in the digitally signed assertion communicating authorization to access the encrypted set of AI information, present the digitally signed authorization capability invocation directly to a portion of the encrypted data vault configured to receive requests for access to the encrypted set of AI information, receive the encrypted set of AI information and keys for decrypting the encrypted set of AI information in response to the presentation of the digitally signed authorization capability invocation, decrypt the encrypted set of AI information using the keys, operate on or with the decrypted set of AI information to generate a result useable to facilitate machine learning, model operation, and/or data aggregation, wherein the encrypted data vault is configured by the providing client computer to selectively control access by the requesting client computer to the encrypted set of AI information by validating the authorization capability invocation.

* * * * *